United States Patent
Lopez

(10) Patent No.: US 10,498,496 B2
(45) Date of Patent: Dec. 3, 2019

(54) RETRANSMISSION TECHNIQUE

(71) Applicant: Telefonaktiebolaget LM Ericsson (publ), Stockholm (SE)

(72) Inventor: Miguel Lopez, Solna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 64 days.

(21) Appl. No.: 15/759,733

(22) PCT Filed: Feb. 3, 2017

(86) PCT No.: PCT/EP2017/052351
§ 371 (c)(1),
(2) Date: Mar. 13, 2018

(87) PCT Pub. No.: WO2018/082816
PCT Pub. Date: May 11, 2018

(65) Prior Publication Data
US 2019/0052412 A1    Feb. 14, 2019

(51) Int. Cl.
*H04L 1/18* (2006.01)
*H04L 1/00* (2006.01)
*H04L 1/08* (2006.01)
*H04L 5/00* (2006.01)

(52) U.S. Cl.
CPC .......... *H04L 1/1806* (2013.01); *H04L 1/0057* (2013.01); *H04L 1/08* (2013.01); *H04L 1/1819* (2013.01); *H04L 1/1848* (2013.01); *H04L 5/0055* (2013.01)

(58) Field of Classification Search
CPC ....... H04L 1/1806; H04L 1/1848; H04L 1/08; H04L 1/0057; H04L 1/1819; H04L 5/0055
See application file for complete search history.

(56) References Cited

U.S. PATENT DOCUMENTS

| | | | |
|---|---|---|---|
| 2010/0061259 A1* | 3/2010 | Larsson | H04L 1/0026 370/252 |
| 2010/0088568 A1* | 4/2010 | Larsson | H04L 1/1607 714/751 |
| 2017/0257298 A1* | 9/2017 | Maeda | H04L 43/0829 |

(Continued)

OTHER PUBLICATIONS

M. Swadesh and M. S. Islam, "A new modified prime codes for higher user capacity in smart synchronous OCDMA network," 2014 International Conference on Electrical Engineering and Information & Communication Technology, Dhaka, 2014, pp. 1-5. (Year: 2014).*

(Continued)

*Primary Examiner* — Cynthia Britt
(74) *Attorney, Agent, or Firm* — Rothwell, Figg, Ernst & Manbeck, P.C.

(57) ABSTRACT

A technique for transferring data (602) that is representable by N data symbols (606) of a finite field is described. The size of the field is an integer power of a Mersenne prime. As to a method aspect of the technique, a polynomial over the finite field is determined based on the N data symbols (606). More than N code symbols (610) of the finite field are used for transmitting or initiating to transmit the data (602). At least one of the code symbols (610) corresponds to an evaluation of the polynomial at a non-primitive element of the finite field.

22 Claims, 11 Drawing Sheets

(56) References Cited

U.S. PATENT DOCUMENTS

2018/0115327 A1* 4/2018 Loewenstein ....... G06F 11/1044
2018/0167144 A1* 6/2018 Howlader ............ H04B 10/112

OTHER PUBLICATIONS

W. C. Kwong, C. Chang and G. Yang, "Extended multilevel prime codes for optical-Cdma networks with algebraic code switching," 2013 IEEE 11th Malaysia International Conference on Communications (MICC), Kuala Lumpur, 2013, pp. 304-309 (Year: 2013).*

M. V. Pedersen, J. Heide, P. Vingelmann and F. H. P. Fitzek, "Network coding over the 232-5 prime field," 2013 IEEE International Conference on Communications (ICC), Budapest, 2013, pp. 2922-2927. (Year: 2013).*

International Search Report and Written Opinion issued in International Application No. PCT/EP2017/052351, dated Nov. 15, 2017, 14 pages.

Garg, Hari K. et al., "Cyclotomic Polynomial Factorization in Finite Integer Rings With Applications to Digital Signa Processing", IEEE Transactions on Circuits and Systems II: Analog and Digitalsignal Processing, Institute of Electrical and Electronics Engineers Inc., vol. 46, No. 5, May 1999, New York, NY, 9 pages.

Golomb, Solomon W. et al., "Actions of the Unitary Group on Irreducible/Primitive Polynomials and Their Applicants to Randomness of Sequences", Information Theory for Wireless Workshop on, IEEE, PI, Jul. 2007, 5 pages.

Thomas, Jay J. et al., "Implementing Exact Calculations in Hardware", IEEE Transactions on Computers, vol., C-36, No. 6, Jun. 1987, 5 pages.

Thomas, Jay J. et al., "The Calculation of Multiplicative Inverses Over Gf(P) Efficiently Where P is a Mersenne Prime", IEEE Transactions on Computers, vol., C-35, No. 5, May 1986, 5 pages.

Metzner, John J., "An Improved Broadcast Retransmission Protocol", IEEE Transactions on Communications, vol., Com-32, No. 6, Jun. 1984, 5 pages.

* cited by examiner

RETRANSMISSION TECHNIQUE

CROSS REFERENCE TO RELATED APPLICATION(S)

This application is a 35 U.S.C. § 371 National Stage of International Patent Application No. PCT/EP2017/052351, filed Feb. 3, 2017, designating the United States, the disclosure of which is incorporated by reference.

TECHNICAL FIELD

The present disclosure generally relates to a retransmission technique for transferring data. More specifically, methods and devices are provided for transmitting and receiving data in a radio communication.

BACKGROUND

In existing radio communication protocols, including broadcast and unicast protocols, data to be transmitted is segmented into data portions defining the payload of protocol data units. The protocol data units are, e.g., frames generated by a data link layer. The data portions are transmitted from a transmitter to one or more receivers, e.g., remote nodes of a radio network. Broadcast examples include Digital Video Broadcasting (DVB) and Bluetooth broadcasting. A unicast example in cellular telecommunications for the segmentation includes the Radio Link Control (RLC) layer of the Third Generation Partnership Project (3GPP) Long Term Evolution (LTE).

If the radio communication protocol supports positive or negative acknowledgements, each receiver can report which data portions have not been successfully received, or alternatively, which data portions have been successfully received. The missing data portions are retransmitted. However, retransmitting individual receiver-specific data portions from the transmitter to the corresponding receivers is complicated to handle, causes latency and is inefficient in terms of power consumption at both the transmitter and the receiver and in terms of radio resources, including the time needed for transmitting the data, reporting acknowledgements and retransmitting data portions.

If the radio communication protocol does not support acknowledgements, the transmitter may preemptively retransmit certain data portions in order to increase the probability of the complete data been correctly received. However, preemptively retransmitting certain data portions without knowing if and which data portions are missing at the receivers is even more inefficient in terms of radio resources.

The document "An Improved Broadcast Retransmission Protocol" by J. J. Metzner, IEEE Transactions on Communications, Vol. COM-32, No. 6, pp. 679-683, describes a broadcast protocol for transferring one file as the data to multiple different sites. The data for transmission is segmented into N frames $y_n$, n=1, ..., N, each consisting of B bits. Thus, a frame can be considered as an element in the Galois field $GF(2^B)$. The retransmitted frames are not exact replicas of initially unacknowledged frames, but are chosen to provide additional information to all sites having one or more non-decodable frames. The frames are encoded by means of a Reed-Solomon code and the resulting code symbols become the frames for transmission or retransmission. Once a receiver has decoded correctly any N frames out of the total of N+K transmitted frames, the receiver can recover the entire data $y_n$, n=1, ..., N, because Reed-Solomon codes are maximum distance separable (MDS).

Low-density parity-check (LDPC) codes are another example of linear block codes for erasure channels. LDPC codes can approach the theoretical capacity of the channel. Moreover, fountain codes (also referred to as rateless erasure codes) have been constructed to provide a large number of N+K frames (e.g., approaching infinity), while the receiver needs to collect N'=(1+ϵ)·N frames to decode the data. Examples of fountain codes include raptor codes. In practice, it is desirable that the probability for decoding is as high as possible for small ϵ. For good fountain codes, ϵ approaches zero as N+K approaches infinity. That is, the fountain code is asymptotically optimal. J. D. Ellis; M. B. Pursley, "Adaptive Transmission Protocols for Fountain-Coded Multicast Transmissions in Packet Radio Networks," in IEEE Transactions on Communications, vol. PP, no. 99, pp. 1-1, describe applications of Fountain coding.

While the retransmission protocols based on Reed-Solomon codes or more modern codes such as raptor codes have been proven to work well, existing schemes based on Reed-Solomon codes may suffer from problems of algorithmic complexity, especially when the size, $2^B$, of the field becomes large. For example, the arithmetic in $GF(2^{512})$ is challenging and not-well suited for implementation in low-end devices. More recent methods based on LDPC codes or raptor codes require iterative decoders and the systemization complexity is not negligible. In this respect, systemization may refer to any process of arranging all the components (e.g., in software and hardware) needed to implement a certain technique (e.g., an encoding process and/or a decoding process). More specifically, systemization may encompass arranging and/or configuring at least one of memory, digital signal processors, hardware buses and algorithms for implementing a certain technique.

In summary, existing retransmission protocols can suffer from high algorithmic complexity or complex systemization, or can be not well-suited for applications targeting low-end devices, such as mesh networks including Internet of Things (IoT) devices having a limited power and processing capacity.

SUMMARY

Accordingly, there is a need for a retransmission technique that is efficient in terms of radio resources and processing complexity at transmitter and receiver side. More specifically, there is a need for a technique that allows retransmitting data with less radio resources, less latency and/or less coding or decoding complexity.

As to one aspect, a method of transmitting data is provided. The data is represented or representable by N data symbols of a finite field. The size of the finite field is an integer power of a Mersenne prime. The method comprises a step of determining, based on the N data symbols, a polynomial over the finite field. The method further comprises a step of transmitting or initiating to transmit the data using more than N code symbols of the finite field. At least one of the code symbols corresponds to an evaluation of the polynomial at a non-primitive element of the finite field.

The data may include a stream, a message and/or control signaling. The non-primitive element may be any element of the finite field whose order in the finite field is less than the size of the finite field without the element zero. The finite field may also be referred to as a Galois field. The size of the finite field may be a Mersenne prime, $M_p=2^p-1$, or any positive integer power, q, of a Mersenne prime, $(M_p)^q$. The positive integer q for the power may be even, e.g., a power of 2. For example, the size of the field may be the square of a Mersenne prime.

The method may be implemented in such a way that firstly N out of the more than N code symbols are transmitted and that secondly some of the data is retransmitted by transmitting the at least one of the code symbols corresponding to an evaluation of the polynomial at the non-primitive element of the finite field. The first N of the code symbols which are firstly transmitted may represent the data. The retransmission may add redundancy to the transmission. The redundancy may enable a receiver to successfully receive the data, e.g., if a number of code symbols corresponding to the number of the at least one code symbol is incorrectly received.

The method may be performed by a device, for example a station. E.g., a station of a radio network may transmit the data (transmitting station). The data may be transmitted in a radio communication or wireless communication, e.g., to one or more receiving stations of the radio network. In other words, the radio communication or the wireless communication includes the data transmission from the transmitting station and a corresponding data reception at one or more receiving stations.

The station may be any device configured for radio communication or wireless communication.

The station may be embodied as an end device or terminal. The station may be a user equipment (UE), a mobile station, a portable station and/or a device for machine-type communication (MTC). Examples for the UE and the mobile station include a mobile phone and a tablet computer. Examples for the MTC device include robots, sensors and/or actuators, e.g., in manufacturing, automotive communication and home automation. Furthermore, MTC devices may be implemented in household appliances and consumer electronics. Examples for the portable station include a television set.

Alternatively or in addition, the station may be embodied as a controlling station of the radio network or a radio network node of the radio network, e.g. a radio access node. Examples for the controlling station or the radio access node include a base station (e.g., a 3G base station or Node B, 4G base station or eNodeB, or a 5G base station or gNodeB), an access point (e.g., a Wi-Fi access point) and a network controller (e.g., according to Bluetooth, ZigBee or Z-Wave).

The radio network may include at least one controlled station (e.g., the UE, the mobile or portable station and/or the MTC device) and/or at least one controlling station (e.g., the base station, the access point and/or the network controller). The at least one controlling station may define, or may be part of, a radio access network (RAN), e.g., according to the Global System for Mobile Communications (GSM), the Universal Mobile Telecommunications System (UMTS), Long Term Evolution (LTE) or New Radio (NR).

The technique may be implemented for a broadcast protocol or a unicast protocol. The retransmission (i.e., the transmission of the at least one code symbol) may be responsive to a report, a negative acknowledgment (NACK), missing acknowledgment (ACK) and/or preemptive. The technique may be implemented in an acknowledged transmission option, i.e. when the receiver sends such feedback reports to the transmitter, or an unacknowledged transmission option, i.e. when the receiver sends no feedback reports to the transmitter.

The technique may be implemented as a retransmission protocol, e.g., for IoT applications and/or applications with modest requirements on the data rate. The technique can be implemented in low-end devices. The radio network may be a mesh network.

The technique may be implemented for transmitting the data on an erasure channel, e.g., on a binary erasure channel (BEC) or a packet erasure channel (PEC), which is an extension of the BEC, wherein one transmission unit includes multiple bits (e.g., the p bits representing one of the code symbols), i.e., a "packet" of consecutive bits. Independent of the protocol layer responsible for the transmission and retransmission, the transmission units may be referred to as protocol data units (PDUs). The PDU may be a frame (e.g., for the protocol layer being the data link layer) or a packet (e.g., for the protocol layer being the network layer).

PDUs transmitted over the erasure channel may be either transmitted correctly (i.e., valid) or known to be lost (at least at the corresponding receiving station). A Cyclic Redundancy Check (CRC) may be used to determine, if the transmitted PDU is valid (i.e. successfully received without errors) or corrupted (i.e. erroneous). The advent of Internet has made erasure channels valid real world channel models. Furthermore, the technique may be implemented in any wireless or radio network, e.g., cellular or radio access networks, ad-hoc networks or home automation networks.

A received PDU corrupted (e.g., by noise) over the erasure channel may be excluded from processing according to the technique at the receiving station. The corrupted PDU may be lost or marked (as erased or erroneous) by the channel or radio network. For example, the PDU is dropped or marked by the protocol layer responsible for the reception at the receiving station (e.g., the protocol layer below the layer implementing the technique at the receiving station). In case an error is detected by an intermediate node (e.g., as part of the channel between the transmitting station and the receiving station and/or in a meshed network), the PDU may be dropped or marked by the intermediate node.

The method may be implemented on a Physical Layer (PHY), a Medium Access Control (MAC) layer and/or a Radio Link Control (RLC) layer of a protocol stack for the radio communication.

The method may further comprise the step of receiving, from the receiving station (e.g., in a unicast transmission) or from each of the one or more of the receiving stations (e.g., in a broadcast transmission) a report indicative of a number of incorrectly received code symbols. The report may be received in response to transmitting the first N code symbols. A maximum of the reported numbers may be determined. A number of the at least one code symbol (i.e., the code symbols for the retransmission) may be equal to the reported number or the determined maximum.

The more than N code symbols may also be referred to as N+K code symbols, wherein K≥1. The at least one of the code symbols corresponding to an evaluation of the polynomial may also be referred to as the L code symbols, wherein L≥1. The transmission of the first N code symbols may be referred to as the data transmission. The transmission of the at least one further code symbol (i.e., the K further code symbols) may be referred to as the data retransmission. For example, K>1 or K>2.

An implementation that embeds the data symbols in the encoded output, i.e., in the code symbols, may be referred to as a systematic implementation. An implementation that does not contain the data symbols in the encoded output, i.e., in the code symbols, may be referred to as a non-systematic implementation.

In a systematic implementation, N code symbols among the N+K code symbols (e.g., the first N code symbols) may correspond to (e.g., may be equal to) the N data symbols. Preferably, the first N code symbols of the N+K code symbols may correspond to (e.g., may be equal to) the N data symbols. The N code symbols that correspond to or are equal to the data symbols may be referred to as transmit symbols. The at least one of the code symbols corresponding to an evaluation (i.e., the K=L further code symbols) may be referred to as parity symbols or retransmit symbols. The N data symbols may be transmitted prior to transmitting the at least one code symbol corresponding to an evaluation. In a non-systematic implementation, the L code symbols corresponding to an evaluation of the polynomial may include more than the K further code symbols (i.e., L>K). For example, each of the N+K code symbols may correspond to an evaluation of the polynomial (i.e., L=N+K).

The at least one of the code symbols corresponding to an evaluation, i.e., the L code symbols, may correspond to L evaluations of the polynomial at L different elements of the finite field, respectively. For example, L>1. Since a Vandermonde matrix is regular for the L different elements, a receiving station may be enabled to determine K coefficients of the polynomial based on successfully receiving K of the at least one code symbol corresponding to an evaluation (i.e., the L code symbols), wherein K≤L. By way of example, if the receiving station has successfully received only N−K of the first N code symbols in the data transmission, successfully receiving the K further code symbols in the data retransmission enables the receiving station to determine the N coefficients of the polynomial and, thus, the N data symbols.

The at least one of the code symbols (i.e., the L code symbols) may be generated by evaluating the polynomial at different powers of the non-primitive element. The non-primitive element may be $\alpha \neq 1$. The polynomial may be evaluated at the elements $\alpha^i$ for $i=0, \ldots, L-1$. The number, L, of the at least one of the code symbols may be equal to K.

The order of the non-primitive element in the finite field may be equal to or greater than the number of the at least one of the code symbols. That is, L is equal to or less than the order of the non-primitive element.

The Mersenne prime may be equal to $2^p-1$ with a prime p>2. The non-primitive element $\alpha$ may be equal to 2 or an integer power of 2 (i.e., $\alpha=2^v$). The order of the non-primitive element may be greater than or equal to p. For example, if the Mersenne prime is equal to $2^p-1$ and the non-primitive element is equal to 2, the order of the non-primitive element is p. Furthermore, if the Mersenne prime is equal to $2^p-1$, and the non-primitive element is equal to $2^v$ with an integer v>1, the order of the non-primitive element is p. If the Mersenne prime is equal to $(2^p-1)^2$ and the non-primitive element is equal to 2+2J, the order of the non-primitive element is 8p. Herein, J may represent a solution of the quadratic equation $x^2+1=0$.

The order of the non-primitive element in the finite field may be equal to or greater than the number of the retransmit symbols (i.e., K), e.g., for the systematic implementation. For a first example of the systematic implementation, the N data symbols directly define both the N transmit symbols and the N coefficients of the polynomial. Only the K further code symbols (i.e., the K retransmit symbols) are computed by evaluating the polynomial (e.g., at different powers of the non-primitive element).

Alternatively or in addition, the order of the non-primitive element in the finite field may be equal to or greater than the number of the more than N code symbols (i.e., N+K), e.g., for the non-systematic implementation. Each of the more than N code symbols (i.e., the N+K code symbols) may correspond to an evaluation of the polynomial (e.g., at different powers of the non-primitive element). In an example for the non-systematic implementation, the coefficients of the polynomial may be equal to the data symbols. The more than N code symbols may be generated by evaluating the polynomial at different powers of the non-primitive element (e.g., resulting in N+K code symbols each being different from the N data symbols). In a second example for the systematic implementation, the coefficients of the polynomial are computed based on an inverse of a Vandermonde matrix so that the first N code symbols (i.e., evaluations of the polynomial, e.g., at different powers of the non-primitive element) are equal to the N data symbols. The K further code symbols for the retransmission (i.e., further evaluations of the polynomial, e.g. at further powers of the non-primitive element) in the second example of the systematic implementation may be different from the K further code symbols for the retransmission in the first example of the systematic implementation.

The method may further comprise a step of mapping or initiating to map the data to the N data symbols. Determining the polynomial may include linearly mapping the N data symbols to coefficients of the polynomial (e.g., according to above-mentioned inverse of the Vandermonde matrix).

A degree of the polynomial may be less than N. The degree of the polynomial may be equal to N−1. The N data symbols may be isomorphically mapped to the (e.g., N) coefficients of the polynomial. Alternatively, the N data symbols may be monomorphically mapped to the (e.g., N or more) coefficients of the polynomial. The technique may be implemented with the degree of the polynomial being equal to N+t−1, wherein t coefficients of the polynomial are predefined (e.g., preset independently of the data).

The data may be represented or representable by a sequence of the N data symbols. The sequence may be mapped by a monomorphism or an isomorphism to the coefficients of the polynomial. The isomorphism may be the identity or a permutation (e.g., the sequence in inverse order). In other words, the polynomial may be determined by coefficients of the polynomial that are equal to the N data symbols. The sequence of the N data symbols may also be referred to as a data word or an information word.

Each of the more than N code symbols may be transmitted in a separate protocol data unit (PDU). The PDUs may be frames. The data transmission may comprise N PDUs carrying the N code symbols, respectively. The data retransmission may comprise K PDUs carrying the K further code symbols, respectively. E.g., in the systematic implementation, the first N PDUs may be transmitted in a sequence that corresponds to the sequence of the N data symbols or that corresponds to a permutation of the sequence of the N data symbols.

The method may further comprise a step of generating or initiating to generate the N data symbols by segmenting the data into N data portions, e.g., groups of p bits or multiples thereof (i.e., p·q bits) according to the exponent p of the Mersenne prime $2^p-1$. Each data symbol may comprise, or may be representable by, p bits or a multiple thereof (i.e., p·q bits). The N data symbols may be equal to, or computed based on, the N data portions. For the size of the finite field being the Mersenne prime, the data may comprise p·N bits or less. For the size of the finite field being an integer power q>1 of the Mersenne prime, each data symbol may comprise p·q bits. The data may comprise p·q·N bits or less.

Generating the data symbols may include processing the data or the data portions. Each of the N data symbols may be represented or representable by the p bits which are not all zeros or not all ones, e.g., as a result of the processing. The processing may be referred to as scrambling or whitening. Alternatively or in addition, a data symbol, a code symbol and/or an element of the finite field that is all zeros may be equivalent to all ones.

Each code symbol and/or each PDU may contain, and/or may be transmitted in association with, a portion for error detection. The portion may enable a receiving station to detect an erroneous reception of the corresponding code symbol and/or the corresponding PDU.

The data (e.g., the N data symbols, the at least one of the code symbols or each of the more than N code symbols) may be transmitted on an erasure channel. The portion for error detection may include a check value, e.g., a cyclic redundancy check (CRC) value. In each PDU (e.g., each frame), the portion may be included in a field for error detection. For example, each PDU may include a CRC value protecting the corresponding code symbol in the PDU.

In a first variant, for each data portion, a CRC value (which may be referred to as inner CRC value) may be computed based on the data portion and/or attached (e.g., by appending the bits representing the CRC value) to the data portion. The aggregate of the data portion and the corresponding CRC value may be equal to the corresponding data symbol or may be (e.g., injectively and surjectively) mapped to the corresponding data symbol (i.e., the symbol in the Galois field that is the starting point of or input to the determining step). The data symbols generated in this way (i.e., the data word) may completely determine the code word (i.e., the more than N code symbols, e.g., the N transmit symbols and the at least one retransmit symbol). The first variant may be implemented to enable a receiving station to verify the correct reception of individual data symbols, e.g., individually for each transmit symbol and/or for any one out of the N data symbols determined according the technique.

In a second variant, which may be combined with the first variant, for each of the more than N code symbols, a CRC value (which may be referred to as outer CRC value) may be computed based on the code symbol and/or attached (e.g., by appending the bits representing the CRC value) to the code symbol. Each aggregate of the code symbol and the corresponding CRC value may be transmitted. E.g., each aggregate of the code symbol and the corresponding CRC value may be included (or encoded) in one of the PDUs. The second variant may be implemented to enable a receiving station to verify the correct reception of individual code symbols (e.g., parity symbols) or PDUs. The code symbols or PDUs may be individually verified for some or each of the more than N received code symbols or PDUs, e.g., before determining all of the N data symbols.

In a third variant, which may be combined with the first or the second variant, a CRC value (which may be referred to as integral CRC value) may be computed by means of the polynomial. For example, each data portion may be mapped to a different one of the data symbols. The mapping may be injective and not surjective. For example, the size of the finite field may be equal to $(2^p-1)^q$, with the Mersenne prime equal to $2^p-1$ and q equal to 1 or an even number, so that each data symbol is representable by $q \cdot p$ bits. Each of the data portions may be represented or representable by m bits, wherein $m<q \cdot p$. For each data portion, the corresponding m bits may be mapped to the data symbol by appending a string of $q \cdot p - m$ bits. The string of bits may be equal for all N data symbols representing the data. The data symbols (i.e., the data word) resulting from the mapping may completely determine the code word (i.e., the more than N code symbols) by evaluating the polynomial. The third variant may be implemented to enable the receiving station to individually verify the correct reception of the code symbols or PDUs, e.g., before determining all of the N data symbols. A reception may be detected as erroneous, if the received code symbol is not in the subset of $2^m$ code symbols defining the symbol alphabet according to the not surjective mapping and evaluations of the polynomial.

Optionally, e.g., in combination with the first, second and/or third variant, a further CRC value (which may be referred to as over-all CRC value) may be computed based on the data (e.g., all of the N data symbols). The over-all CRC value may be transmitted separately (e.g., in a separate PDUs) or in association with one or each of the code symbols or PDUs.

The step of determining and/or the evaluation may include performing circular bit shifts.

As to another aspect, a method of receiving data is provided. The data is represented or representable by N data symbols of a finite field. The size of the finite field is an integer power of a Mersenne prime. The method comprises a step of determining the N data symbols based on at least N received code symbols out of more than N code symbols. The determining includes determining a polynomial based on the at least N received code symbols. At least one of the code symbols corresponds to an evaluation of the polynomial over the finite field at a non-primitive element of the finite field.

The method may be performed by a station. The station may be any device configured for radio communication or wireless communication. E.g., one or more stations of a radio network may receive the data (receiving stations). The receiving station may be embodied by any station defined above in the context of the one method aspect. The data may be received in a radio communication or wireless communication, e.g., from a transmitting station of the radio network.

An instance of the method may be performed by each of the one or more receiving stations. The receiving stations may define or may be part of a radio network. E.g., each of the one or more receiving stations may be in radio or wireless communication with a RAN or may be part of the RAN.

The method may further comprise any feature disclosed in the context of the one method aspect and/or one or more steps corresponding to any of the steps of the one method aspect.

As to another aspect, a computer program product is provided. The computer program product comprises program code portions for performing any one of the steps of the method aspects disclosed herein when the computer program product is executed by one or more computing devices. The computer program product may be stored on a computer-readable recording medium. The computer program product may also be provided for download via a data network, e.g., via the radio network and/or via the Internet and/or by the transmitting station. Alternatively or in addition, the method may be encoded in a Field-Programmable Gate Array (FPGA) and/or an Application-Specific Integrated Circuit (ASIC), or the functionality may be provided for download by means of a hardware description language.

As to one device aspect, a device for transmitting data is provided. The data is represented or representable by N data symbols of a finite field. The size of the finite field is an integer power of a Mersenne prime. The device is configured to perform the one method aspect.

Alternatively or in addition, the device may comprise a determining unit configured to determine, based on the N data symbols, a polynomial over the finite field. The device may further comprise a transmitting unit configured to transmit or initiate to transmit the data using more than N code symbols of the finite field. At least one of the code symbols may correspond to an evaluation of the polynomial at a non-primitive element of the finite field.

As to another device aspect, a device for receiving data is provided. The data is represented or representable by N data symbols of a finite field. The size of the finite field is an integer power of a Mersenne prime. The device is configured to perform the other method aspect.

Alternatively or in addition, the device may comprise a determining unit configured to determine the N data symbols based on at least N received code symbols out of more than N code symbols. The determining may include determining, based on the at least N received code symbols, a polynomial over the finite field. At least one of the code symbols may correspond to an evaluation of the polynomial at a non-primitive element of the finite field.

As to a further device aspect, a device for transmitting data is provided. The data is represented or representable by N data symbols of a finite field. The size of the finite field is an integer power of a Mersenne prime. The device comprises at least one processor and a memory. Said memory comprises instructions executable by said at least one processor whereby the device is operative to determine, based on the N data symbols, a polynomial over the finite field. Execution of the instructions causes the device to be operative to transmit or initiate to transmit the data using more than N code symbols of the finite field. At least one of the code symbols corresponds to an evaluation of the polynomial at a non-primitive element of the finite field.

As to a further device aspect, a device for receiving data is provided. The data is represented or representable by N data symbols of a finite field. The size of the finite field is an integer power of a Mersenne prime. The device comprises at least one processor and a memory. Said memory comprises instructions executable by said at least one processor whereby the device is operative to determine the N data symbols based on at least N received code symbols out of more than N code symbols. The determining includes determining, based on the at least N received code symbols, a polynomial over the finite field. At least one of the code symbols corresponds to an evaluation of the polynomial at a non-primitive element of the finite field.

As to a further aspect, a device for transmitting data is provided. The data is represented or representable by N data symbols of a finite field. The size of the finite field is an integer power of a Mersenne prime. The device may be comprise one or more modules for performing the one method aspect. Alternatively or in addition, the device comprises a polynomial module for determining, based on the N data symbols, a polynomial over the finite field. The device further comprises a transmission module for transmitting or initiating to transmit the data using more than N code symbols of the finite field. At least one of the code symbols corresponds to an evaluation of the polynomial at a non-primitive element of the finite field.

As to a further aspect, a device for receiving data is provided. The data is represented or representable by N data symbols of a finite field. The size of the finite field is an integer power of a Mersenne prime. The device may comprise one or more modules for performing the other method aspect. Alternatively or in addition, the device comprises a polynomial module for determining the N data symbols based on at least N received code symbols out of more than N code symbols. The determining includes determining, based on the at least N received code symbols, a polynomial over the finite field. At least one of the code symbols corresponds to an evaluation of the polynomial at a non-primitive element of the finite field.

The devices and/or the stations may further include any feature disclosed in the context of the method aspects. Particularly, any one of the units and modules, or a dedicated unit or module, may be configured to perform or initiate one or more of the steps of any one of the method aspects.

BRIEF DESCRIPTION OF THE DRAWINGS

Further details of embodiments of the technique are described with reference to the enclosed drawings, wherein.

DETAILED DESCRIPTION

In the following description, for purposes of explanation and not limitation, specific details are set forth, such as a specific network environment in order to provide a thorough understanding of the technique disclosed herein. It will be apparent to one skilled in the art that the technique may be practiced in other embodiments that depart from these specific details. Moreover, while the following embodiments are primarily described for a 5G New Radio (NR) implementation, it is readily apparent that the technique described herein may also be implemented in any other radio network, including 3GPP LTE or a successor thereof, Wireless Local Area Network (WLAN) according to the standard family IEEE 802.11, Bluetooth according to the Bluetooth Special Interest Group (SIG), particularly Bluetooth Low Energy and Bluetooth broadcasting, and/or ZigBee based on IEEE 802.15.4.

Moreover, those skilled in the art will appreciate that the functions, steps, units and modules explained herein may be implemented using software functioning in conjunction with a programmed microprocessor, an Application Specific Integrated Circuit (ASIC), a Field Programmable Gate Array (FPGA), a Digital Signal Processor (DSP) or a general purpose computer, e.g., including an Advanced RISC Machine (ARM). It will also be appreciated that, while the following embodiments are primarily described in context with methods and devices, the invention may also be embodied in a computer program product as well as in a system comprising at least one computer processor and memory coupled to the at least one processor, wherein the memory is encoded with one or more programs that may perform the functions and steps or implement the units and modules disclosed herein.

Figure 1:
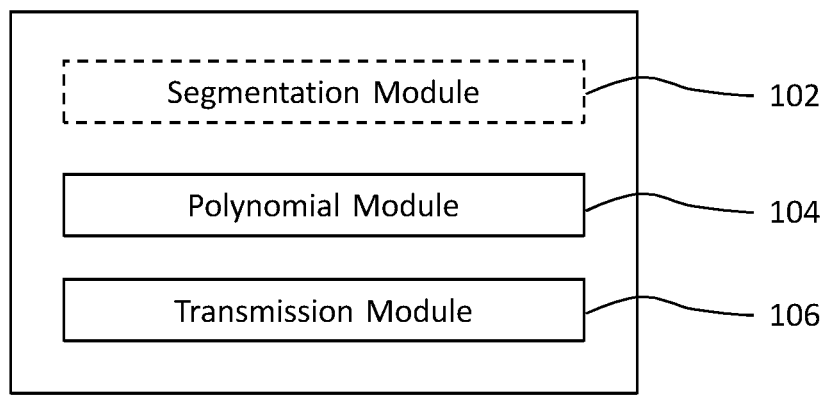
FIG. 1 shows a schematic block diagram of a device embodiment for transmitting data.

FIG. 1 schematically illustrates a block diagram of an embodiment of a device for transmitting data, which device is generically referred to by reference sign 100.

The device 100 may be connected to and/or part of a radio network. The device 100 may be implemented at a transmitting station of the radio network, at a node of the radio network controlling the transmitting station or by a combination thereof. The transmitting station may transmit (e.g., broadcast) the data to one or more receiving stations of the radio network. A channel or path from the transmitting station to the respective receiving station may include one or more hops in the radio network.

The data is representable by N data symbols of a finite field or a Galois field (GF). The size, s, of the finite field GF(s) is a Mersenne prime, $$s = M_p = 2^p - 1,$$

or an integer power of an Mersenne prime, $$s = (M_p)^q = (2^p - 1)^q.$$

The device 100 comprises a polynomial module 104 that determines, based on the N data symbols, a polynomial over the finite field. The device 100 further comprises a transmission module 106 that transmits or initiates to transmit the data using more than N code symbols of the finite field.

The code symbols are computed based on the N data symbols and/or the polynomial. At most N (if any) of the code symbols are equal to the N data symbols or computed directly (e.g., without using the polynomial) from the N data symbols. Each of the at least one further code symbol (e.g., each code symbol) corresponds to an evaluation of the polynomial at a non-primitive element of the finite field, e.g., evaluations of the polynomial at different integer powers of the same non-primitive element of the finite field.

Optionally, the device 100 further comprises a segmentation module 102 that segments the data into N data portions. Each of the N data symbols is equal to, includes or is computed based on a different one of the N data portions. The data portions are preferably equally sized, e.g., each including p bits. Padding bits may be included in one of the N data portions (e.g., the N-th data portion), if a size, l, of the data in bit length is not an integer multiple of p and N.

At least one of p, q and N may be set based on the size l of the data to be transmitted. A technical standard for the radio network may specify one or more values for each of p and/or q. The method 300 may compute the number N of the data symbols as the minimum of $N \cdot p \cdot q \geq l$. For the minimization, the exponent p may be set to any prime that yields a Mersenne prime $M_p$. Alternatively or in combination, the positive integer q may be equal to 1 or may be set to any even number or any value in a subset thereof (e.g., {1, 2, 4}).

Any of the modules of the device 100 may be implemented by units configured to provide the corresponding functionality.

Figure 2:
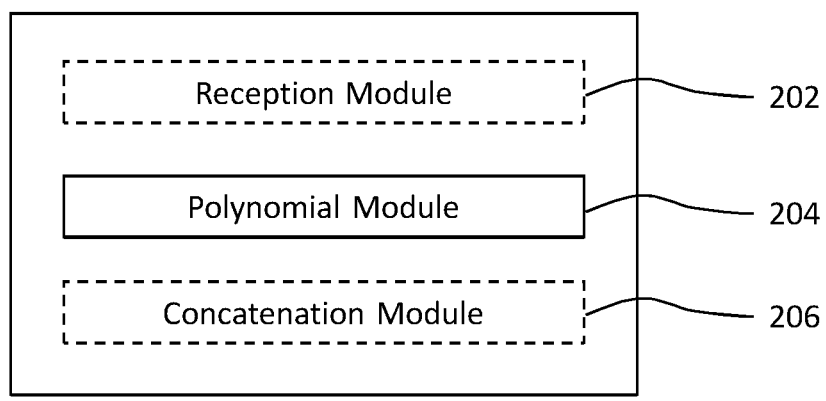
FIG. 2 shows a schematic block diagram of a device embodiment for receiving data.

FIG. 2 schematically illustrates a block diagram of an embodiment of a device for receiving data, which device is generically referred to by reference sign 200. The device 200 may be connected to and/or part of a radio network. The device 200 may be implemented at a receiving station of the radio network, at a node of the radio network controlling the receiving station or by a combination thereof.

The data is representable by N data symbols of a finite field. The size of the field is a Mersenne prime or an integer power thereof. The device 200 optionally comprises a reception module 202 for receiving or initiating to receive the data using more than N code symbols of the finite field, at least one of the code symbols corresponding to an evaluation of a polynomial over the finite field at a non-primitive element of the finite field. The device 200 comprises a polynomial module 204 that determines the N data symbols by determining the polynomial based on received N of the code symbols.

Optionally, the device 200 further comprises a concatenation module 206 that concatenates the N data symbols or N data portions, resulting in the data. Each of the N data portions is equal to, extracted from or is computed based on a different one of the N data symbols. One of the N data portions (e.g., the N-th data portion) may include padding bits, which are not included in the data that is output by the concatenation module 206.

Any of the modules of the device 200 may be implemented by units configured to provide the corresponding functionality.

Each of the transmitting station and the receiving station may include a base station (e.g., a network controller or a Wi-Fi access point) or a radio access node (e.g. a 3G base station, a 4G eNodeB or a 5G gNodeB) of the radio network (e.g., more specifically, of a radio access network providing radio access within the radio network). Alternatively or in addition, each of the transmitting station and the receiving station, may include a mobile or portable station or a radio device connectable to the radio network (e.g., more specifically, connectable to a radio access network providing radio access within the radio network). The radio device may be a user equipment (UE) or a device for machine-type communication (MTC). Alternatively or in addition, each of the transmitting and receiving stations may be configured to provide radio access and/or to wirelessly connect to each other, e.g., in an ad-hoc radio network or via 3GPP sidelinks.

Figure 3:
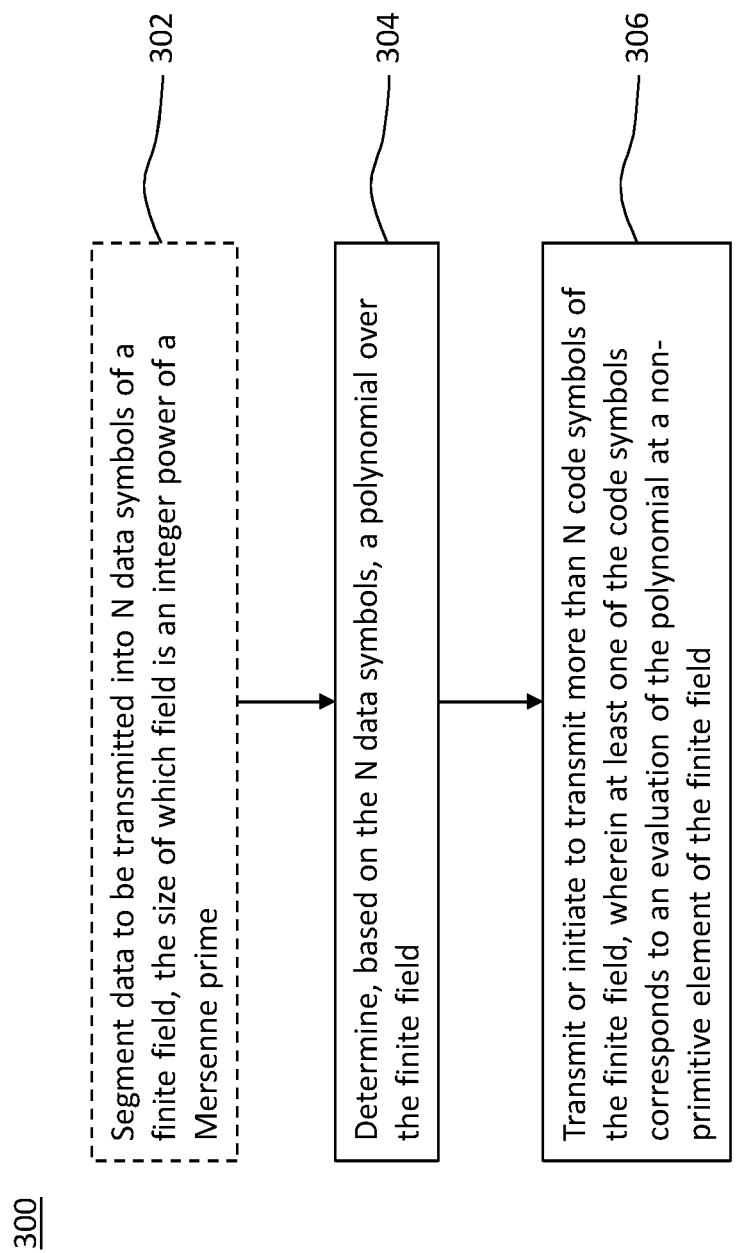
FIG. 3 shows a flowchart of a method embodiment for transmitting data, which is implementable by the device of FIG. 1.

FIG. 3 shows a flowchart for a method 300 of transmitting data that is representable by N data symbols of a finite field. The size of the finite field is an integer power of a Mersenne prime.

The data to be transmitted may be input to the method 300 as the N data symbols or as N data portions for inclusion in or computation of the N data symbols, respectively. Alternatively, the method 300 comprises an optional step 302 of segmenting the data into the N data symbols or the N data portions.

The method 300 comprises a step 304 of determining, based on the N data symbols, a polynomial over the finite field. The method further comprises a step 306 of transmitting or initiating to transmit the data using more than N code symbols of the finite field. At least one of the more than N code symbols corresponds to an evaluation of the polynomial at a non-primitive element of the finite field. The transmission may be a unicast or broadcast transmission.

The method 300 may be performed by the device 100, e.g., at the transmitting station of the radio network. For example, the modules 102, 104 and 106 may perform the steps 302, 304 and 306, respectively.

Figure 4:
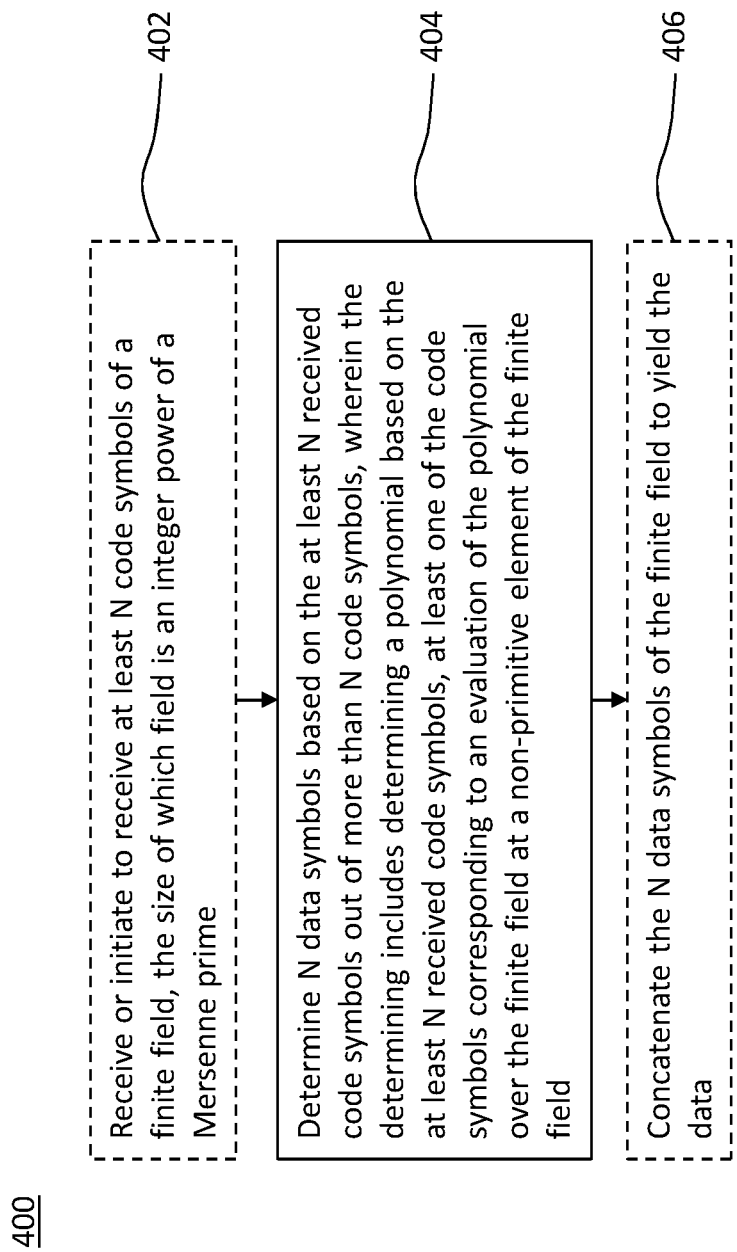
FIG. 4 shows a flowchart of a method embodiment for receiving data, which is implementable by the device of FIG. 2.

FIG. 4 shows a flowchart for a method 400 of receiving data that is representable by N data symbols of a finite field. The size of the finite field is an integer power of a Mersenne prime.

The method 400 comprises a step of receiving or initiating to receive the data using more than N code symbols of the finite field, wherein at least one of the more than N code symbols corresponds to an evaluation of a polynomial over the finite field at a non-primitive element of the finite field. It is not necessary that all of the more than N code symbols are successfully received. In a step 404 of the method 400, the N data symbols are determined by determining the polynomial based on at least N of the code symbols, which are successfully received.

The method 400 may output the data as the N determined data symbols. Alternatively or in addition, the N data symbols, or N data portions respectively extracted or computed from the N data symbols, are concatenated in an optional step 406, resulting in the data.

The method 400 may be performed by the device 200, e.g., at the receiving station. For example, the modules 202, 204 and 206 may perform the steps 402, 404 and 406, respectively.

The method may be implemented as a retransmission protocol. Each of the code symbols is transmitted in the step 306 and/or received in the step 402 in a protocol data unit (PDU), e.g., a frame. The first N PDUs represent the data. The transmission and/or the (not necessarily successful) reception of the first N PDUs is referred to as the first transmission cycle or the data transmission. The transmission and/or the reception of the at least one further PDU, which includes the at least one code symbol resulting from evaluating the polynomial, is referred to as the second transmission cycle or the data retransmission. Data transmission and data retransmission are collectively referred to as data transfer.

The data retransmission of the at least one PDU follows the data transmission of the first N PDUs, e.g., preemptively, responsive to a negative acknowledgment (NACK) from at least one of the receiving stations and/or upon expiration of a timer for an outstanding positive acknowledgment (ACK) from at least one of the receiving stations. The number of the at least one retransmitted PDU may depend on channel quality, the number of received NACKs (e.g., the maximum number of NACKs received from the same receiving station) and/or the number of overdue ACKs (e.g., the maximum number of ACKs outstanding for the same receiving station).

The steps 304 and 306 encode the data represented or representable by a data word comprising the N data symbols into a code word comprising the more than N code symbols, i.e., N+K code symbols with K>0. The code rate is R=N/(N+K). The at least one code symbol, i.e., the K code symbols for the K PDUs of the retransmission, is or are based on an algebraic code defined by the polynomial over the finite field. The K PDUs for the retransmission are generated by the algebraic code. The code symbols of the algebraic code, i.e., the symbol alphabet of the algebraic code, are evaluations of the polynomial at non-primitive elements of the finite field.

At least the K code symbols for the retransmission (e.g., all N+K code symbols) are generated by evaluating the polynomial at different integer powers of the non-primitive element. The L code symbols, with K≤L≤N+K, are generated by evaluating the polynomial at L different integer powers $\alpha^i$ of the non-primitive element $\alpha$. For example, the L code symbols correspond to evaluations of the polynomial at $\alpha^i$ for i=0, . . . , L−1, respectively.

In a first implementation, all code symbols are generated as evaluations of the polynomial (i.e., L=N+K). In a second implementation, not all code symbols are generated as evaluations of the polynomial (i.e., L<N+K). For example, only the K code symbols for the retransmission are generated as evaluations of the polynomial (i.e., L=K). In the second implementation, up to N code symbols may be directly derived from the N data symbols (i.e., without evaluating the polynomial). For example, N code symbols are equal to the N data symbols (e.g., for implementing a systematic code). The further L=K code symbols are generated by evaluating the polynomial.

The retransmission protocol according to the methods 300 and 400 is advantageous for transferring the data from the transmitting station to one or more remote receiving stations. Implementations of the technique can achieve erasure correction properties similar or equal to Reed-Solomon codes. For example, the data retransmission according to the method 300 provides the receiving stations with a means to compensate for the loss of PDUs in the data transmission, independent of which specific PDUs are lost and independently for each receiving station. An implementation of the method 400 reconstructs or decodes the data in the step 404 based on successfully (i.e., correctly) receiving any N code symbols among the more than N code symbols. That is, any subset including N code symbols out of the set of the N+K code symbols is sufficient to decode the data. Thus, signaling overhead and latency can be reduced.

For example, the step 302 splits a message as the data into 30 data portions, each including p bits. The PDUs may be implemented by frames. The frames are broadcasted to several remote nodes as the receiving stations. Suppose that a first node suffered the erasure of frames number 3 and 5, a second node suffered the erasure of frames number 11, 21 and 30 and a third node lost frame number 15. The retransmission protocol according to the methods 300 and 400 has the property that the initial data transmission of 30 frames, each including p bits for the respective data portion (if using a systematic code) or the respective code symbol (if using a non-systematic code), followed by the retransmission of K=3 frames, each including p bits for the respective code symbol, suffices for the each of the three remote nodes to recover the entire message. The K=3 code symbols transmitted in the data retransmission are generated using the algebraic code. Efficient algorithms for encoding and decoding are available, because the required arithmetic operations are performed in a finite field whose size is a Mersenne prime number.

The polynomial (or polynomial function), F, may be determined by N coefficients $c_i$, $$F(X)=c_1+c_2X+c_3X^2+ \ldots +c_{N-1}X^{N-2}+c_NX^{N-1},$$

or more than N coefficients $c_i$. In the step 304, N of the coefficients $c_i$ of the polynomial (e.g., all coefficients of the polynomial) are set to the N data symbols, respectively. Alternatively, the N (or more) coefficients of the polynomial F are determined by an injective linear mapping (i.e., a monomorphism) of the N data symbols. The injective linear mapping for determining the polynomial in the step 304 may be specified by a technical standard for the retransmission protocol in the radio network.

In case the polynomial includes more than N coefficients, the further coefficients of the polynomial may be specified by the technical standard of the radio network or in a negotiation between the transmitting station and the receiving station when establishing radio connectivity. For example, the further coefficients of the polynomial may be computed based on a key for encrypting the data transfer.

The L code symbols that are generated in the step 306 by evaluating the polynomial (i.e., at least the K code symbols for the retransmission, e.g., all N+K code symbols for transmission and retransmission) are determined by means of a generator matrix. The generator matrix maps the coefficients of the polynomial to the code symbols. The generator matrix includes N rows and L columns. The N·L coefficients of the generator matrix include the integer powers of the non-primitive element.

Optionally, if not all code symbols correspond to evaluations of the polynomial (i.e., for K≤L<N+K), N+K−L columns of the identity matrix (of size N) are prepended or appended to the generator matrix, resulting in a generator matrix with N+K columns. In a first example for implementing a systematic code (i.e., L=K), the identity matrix of size N is prepended.

In a second example for implementing a systematic code, all N+K code symbols correspond to evaluations of the polynomial (i.e., L=N+K). The monomorphism in the step 304 for mapping the N data symbols $y_i$, i=1, . . . , N, to the N (or more) coefficients of the polynomial F is determined by (or fulfills):

$$y_i = F(\alpha^{i-1}) \text{ for } i=1, \ldots, N.$$

The generator matrix has full rank, i.e., the generator matrix is an injective linear mapping of the coefficients of the polynomial. In other words, any N columns of the generator matrix are linearly independent. For this reason, the device 200 is enabled to determine the N data symbols in the step 404 based on successfully receiving any N of the N+K code symbols.

An element $\beta \neq 0$ of the finite field $GF(M_p{}^q)$ is a primitive element, if $\beta^i \neq 1$ for all i=1, . . . , $(M_p)^q$−2. Otherwise, the element is non-primitive. The order of an element γ of the finite field $GF(M_p{}^q)$ is the smallest positive integer r, so that $\gamma^r = 1$. The order of any primitive element is equal to $(M_p)^q$−1. The order r of any non-primitive element α is less than $(M_p)^q$−1, i.e., $1 \leq r \leq (M_p)^q$−2. Up to r code symbols may be generated by evaluating the polynomial at integer powers of the non-primitive element, i.e., K≤L≤r.

For example, a non-primitive element ca is 2 for p>3 (i.e., p≥7). The order r of α=2 is equal to the exponent p (i.e., the bit length p for representing any one of the data symbols and/or code symbols). Hence, K≤L≤r=p, which is does not limit the number of K PDUs for the data retransmission, since typically p>>K. The number of K retransmitted PDUs may be specified by the standard of the radio network. For example, K=3.

Alternatively or in addition to the advantageous erasure correction properties, same or further implementations of the technique efficiently generate the code symbols according to the steps 304 and 306 (which may be referred to as encoding) as well as efficiently determine the data symbols according to the step 404 (which may be referred to as decoding). The encoding and/or the decoding may be implemented using an integer arithmetic, e.g., including ones' complement for addition, subtraction, multiplication and/or any integer arithmetic described by the document "Implementing Exact Calculations in Hardware" by J. J. Thomas et al., IEEE Transactions on Computers, Vol. C-36, No. 6, pp. 764-768 and/or the document "The Calculation of Multiplicative Inverses Over GF(P) Efficiently Where P is a Mersenne Prime" by J. J. Thomas et al., IEEE Transactions on Computers, Vol. C-35, No. 5, pp. 478-482.

The primality of the Mersenne prime $M_p = 2^p - 1$ implies that the exponent p itself is a prime number. Below Table lists the smallest 14 Mersenne primes.

| Prime exponent, p | Mersenne prime, $M_p = 2^p - 1$ |
|---|---|
| 2 | 3 |
| 3 | 7 |
| 5 | 31 |
| 7 | 127 |
| 13 | 8191 |
| 17 | 131071 |
| 19 | 524287 |
| 31 | 2147483647 |
| 61 | 2305843009213693951 |
| 89 | 618970019642690137449562111 |
| 107 | 162259276829213363391578010288127 |
| 127 | 170141183460469231731687303715884105727 |
| 521 | 6864797660130609714981900790981393217269435300143305409394463459185543183397656052122559640661454554977296311391480858037121987999716643812574028291115057151 |
| 607 | 531137992816767098689588206552468627329593117727031923199444138200403559860852242739162502265229285668889329486246501015346579337652707239409519978766587351943831270835393219031728127 |

Figure 5:
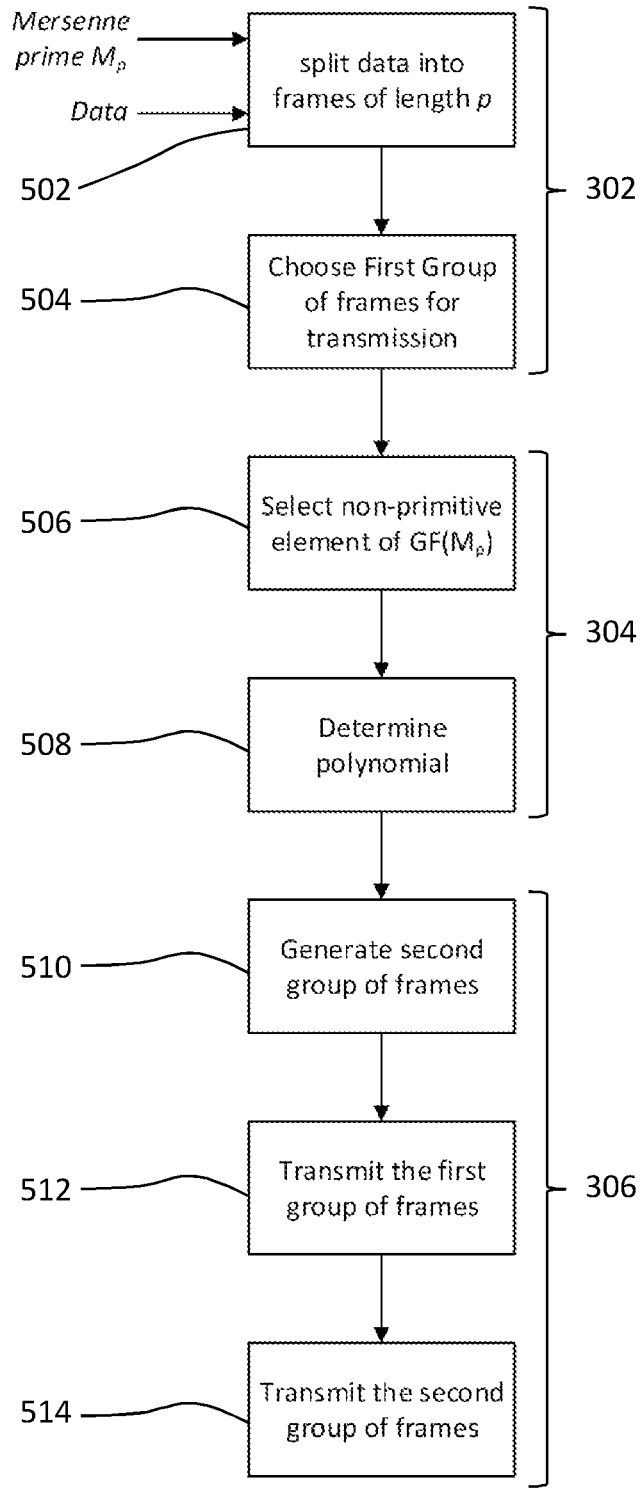
FIG. 5 shows a flowchart for an implementation of the method of FIG. 3.

FIG. 5 shows a flowchart for an implementation of the method 300 as a retransmission protocol, which is combinable with any implementation or embodiment disclosed herein.

In a substep 502 or implementation of the step 302, the data to be transmitted, e.g., a message, is split into N data symbols $y_n$, n=1, . . . , N for N transmission PDUs (e.g., frames). Each of the transmission PDUs may contain code bits (i.e., the output of one or more inner encoders) for representing the corresponding data symbol (e.g., according to above-mentioned second implementation), a PDU check sequence (e.g., a CRC) and possibly padding. The technique is not limited by the exact nature and structure of the data contained in the transmission PDUs for carrying the corresponding data symbol.

Each transmission PDU (e.g., each frame) contains a code symbols of p bits (or an integer multiple q>1) thereof, wherein $M_p = 2^p - 1$ is a Mersenne prime. Hence, each transmission PDU can be considered as an element in the Galois field $GF(M_p)$ or $GF((M_p)^q)$ with q>1. That is, for each n=1, . . . , N: $y_n \in GF((M_p)^q)$ with q≥1. Preferably, the method is implemented with N<p in order not to lose any erasure correction capabilities.

Optionally, e.g., if a number of N' frames resulting from the splitting in the substep 502 for a given p is too large, a subset of N frames is selected as a first group of frames for transmission in a substep 504. The further N'-N frames may be transmitted by repeating the method 300. Otherwise, all N PDUs (e.g., frames) resulting from the splitting in the substep 502 define the first group of PDUs.

In a substep 506 of the step 304, a non-primitive element $\alpha \in GF(M_p)$, or $GF((M_p)^q)$ for $q>1$, is chosen. A primitive element is any non-zero element such that $\alpha^{M_p-1}=1$, but $\alpha^n \neq 1$ if $0<n<M_p-1$. If $p \geq 3$, it is advantageous to set $\alpha=2$, since in this case the number 2 (or its extension $2+2J+ \ldots$ for $q>1$) is not a primitive element of $GF(M_p)$ (or $GF((M_p)^q)$ for $q>1$). Moreover, with the choice $\alpha=2$, multiplication by $\alpha$ or powers of $\alpha$ may be implemented by shifts. It is not necessary that $\alpha$ is determined at connection set-up or at runtime. Rather, the value for $\alpha$ may be predefined by a standard and/or encoded in hardware.

In a substep 508 or implementation of the step 304, a polynomial $F(X)=y_1+y_2X+y_3X^2+ \ldots +y_{N-1}X^{N-2}+y_N X^{N-1}$ over $GF((M_p)^q)$ (for $q \geq 1$) is generated. According to above-mentioned second implementation, the coefficients of the polynomial are the data symbols or frames comprising the message to transmit. Evaluating the polynomial $F(X)$ at any element $\beta \in GF((M_p)^q)$ (for $q \geq 1$) generates another element $F(\beta) \in GF((M_p)^q)$ (for $q \geq 1$).

In a substep 510 of the step 306, a set of K code symbols $[F(\alpha^0), F(\alpha^1), F(\alpha^2), \ldots, F(\alpha^{K-1})]$ is generated by evaluating the polynomial $F(X)$ at powers of the non-primitive $\alpha$. Preferably, $K<p$ in order not to lose any erasure correction capabilities. The K code symbols define a second group of retransmission PDUs (e.g., frames).

Each of the retransmission PDUs may contain code bits (i.e., the output of one or more inner encoders) for representing the corresponding code symbol (e.g., according to above-mentioned second implementation), a PDU check sequence (e.g., a CRC) and possibly padding. The technique is not limited by the exact nature and structure of the data contained in the retransmission PDUs for carrying the corresponding code symbol.

A substep 512 of the step 306 includes a first cycle of transmissions for transmitting the frames $[y_1, y_2, y_3, \ldots, y_N]$ of the first group. An example for allocating the data symbols to the transmission PDUs (e.g., frames) is illustrated in below Table.

Transmission Table

| Transmission # | Transmitted PDU |
|---|---|
| 1 | $y_1$ |
| 2 | $y_2$ |
| . | . |
| . | . |
| . | . |
| N − 1 | $y_{N-1}$ |
| N | $y_N$ |

A substep 514 of the step 306 includes a second cycle of transmissions, i.e., the data retransmission by transmitting the code symbols $[F(\alpha^0), F(\alpha^1), F(\alpha^2), \ldots, F(\alpha^{K-1})]$. The data retransmission is either triggered by ACKs and/or NACKs from the remote nodes or is preemptive (i.e., performed in order to decrease the probability of failure in message decoding by the remote nodes).

An example allocation of code symbols to retransmission PDUs is illustrated in below Table.

Retransmission Table

| Retransmission # | Transmitted PDU |
|---|---|
| 1 | $F(\alpha^0)$ |
| 2 | $F(\alpha^1)$ |
| 3 | $F(\alpha^2)$ |
| . | . |
| . | . |
| . | . |
| K − 1 | $F(\alpha^{K-2})$ |
| K | $F(\alpha^{K-1})$ |

Below Table summarizes protocol parameters that may be set in any implementation or embodiment disclosed herein.

| Parameter | Parameter description | Embodiment |
|---|---|---|
| s | Number of elements in the finite field | $M_p = 2^p - 1$ (Mersenne prime) |
| $\alpha$ | Element used to generate the code word | Non-primitive element (order = p < s − 1) |
| N | Number of transmission PDUs per message | N < p |
| K | Number of retransmissions | K < p |

The method 300, particularly the step 304 of determining the polynomial and the substep 510 of generating the code symbols for the step 306, may be referred to as an encoding process. Similarly, the device 100 may be referred to as an encoder.

A systematic implementation of the encoding process 300 is described in more detail. The encoding process 300 is used to generate the code symbols for the second cycle of transmissions, i.e., the retransmission 514 in the step 306. A convenient choice for the non-primitive element is $c=2$, or a power of 2. This ensures that an efficient arithmetic is available, e.g., according to the document "Implementing Exact Calculations in Hardware" by J. J. Thomas et al., IEEE Transactions on Computers, Vol. C-36, No. 6, pp. 764-768 and/or the document "The Calculation of Multiplicative Inverses Over GF(P) Efficiently Where P is a Mersenne Prime" by J. J. Thomas et al., IEEE Transactions on Computers, Vol. C-35, No. 5, pp. 478-482.

Below Tables illustrate the transmission 512 and the retransmission 514 for a systematic implementation using the non-primitive element $\alpha=2$.

Transmission Table

| Transmission # | Transmitted frame |
|---|---|
| 1 | $y_1$ |
| 2 | $y_2$ |
| . | . |
| . | . |
| . | . |
| N − 1 | $y_{N-1}$ |
| N | $y_N$ |

Retransmission Table

| Retransmission # | Transmitted frame |
|---|---|
| 1 | $F(1)$ |
| 2 | $F(2)$ |
| 3 | $F(2^2)$ |
| . | . |

-continued

Retransmission Table

| Retransmission # | Transmitted frame |
|---|---|
| . | . |
| . | . |
| . | . |
| K − 1 | $F(2^{K-2})$ |
| K | $F(2^{K-1})$ |

The method 400, particularly the step 404, may be referred to as a decoding process. Similarly, the device 200 may be referred to as decoder. The decoding process 400 recovers data symbols (e.g., PDUs or frames in a systematic implementation) that are missing after the first transmission cycle 512 from the received code symbols, i.e. from the N received PDUs among the N+K transmitted PDUs (e.g., frames). Typically, the decoding process 400 is more involved than the encoding process 300.

Suppose that an arbitrary receiving station (or remote node) has suffered K erasures from the first cycle of transmissions 512 (i.e., the data transmission, e.g., according to above Transmission Table). These lost frames are labeled by $n_i$, wherein $1 \leq n_1 < n_2 < \ldots < n_K \leq N$. After reception of the second cycle of transmissions 514 (i.e., the data retransmission, e.g., according to above Retransmission Table), the following relations hold for the device 200 (e.g., at the receiving station).

$$y_{n_1} + y_{n_2} \ldots + y_{n_K} = F(1) - \sum_{i \neq n_1, n_2, \ldots, n_K}^{N} y_i$$

$$y_{n_1} \cdot 2^{(n_1-1)} + y_{n_2} \cdot 2^{(n_2-1)} \ldots + y_{n_K} \cdot 2^{(n_K-1)} =$$
$$F(2) - \sum_{i \neq n_1, n_2, \ldots, n_K}^{N} y_i \cdot 2^{(i-1)}$$

$$y_{n_1} \cdot 2^{2(n_1-1)} + y_{n_2} \cdot 2^{2(n_2-1)} \ldots + y_{n_K} \cdot 2^{2(n_K-1)} =$$
$$F(2^2) - \sum_{i \neq n_1, n_2, \ldots, n_K}^{N} y_i \cdot 2^{(i-1)}$$

$$\vdots$$

$$y_{n_1} \cdot 2^{(K-2)(n_1-1)} + y_{n_2} \cdot 2^{(K-2)(n_2-1)} \ldots + y_{n_K} \cdot 2^{(K-2)(n_K-1)} =$$
$$F(2^{K-2}) - \sum_{i \neq n_1, n_2, \ldots, n_K}^{N} y_i \cdot 2^{(K-2)(i-1)}$$

$$y_{n_1} \cdot 2^{(K-1)(n_1-1)} + y_{n_2} \cdot 2^{(K-1)(n_2-1)} \ldots + y_{n_K} \cdot 2^{(K-1)(n_K-1)} =$$
$$F(2^{K-1}) - \sum_{i \neq n_1, n_2, \ldots, n_K}^{N} y_i \cdot 2^{(K-1)(i-1)}$$

That is, a linear system of K equations with K unknowns is obtained. The unknowns, $y_{n_1}, \ldots, y_{n_K}$, are exactly the missing data symbols (e.g., PDUs or frames in a systematic implementation). The equation system can be represented in matrix form by defining A, $\gamma$, and $\rho$ as follows.

$$A = \begin{bmatrix} 1 & 1 & \cdots & 1 \\ 2^{(n_1-1)} & 2^{(n_2-1)} & \cdots & 2^{(n_K-1)} \\ 2^{2(n_1-1)} & 2^{2(n_2-1)} & & 2^{2(n_K-1)} \\ \vdots & & \ddots & \vdots \\ 2^{(K-2)(n_1-1)} & 2^{(K-2)(n_2-1)} & & 2^{(K-2)(n_K-1)} \\ 2^{(K-1)(n_1-1)} & 2^{(K-1)(n_2-1)} & \cdots & 2^{(K-1)(n_K-1)} \end{bmatrix}$$

$$\gamma = \begin{bmatrix} y_{n_1} \\ y_{n_2} \\ \vdots \\ y_{n_K} \end{bmatrix}$$

$$\rho = \begin{bmatrix} F(1) - \sum_{i \neq n_1, n_2, \ldots, n_K}^{N} y_i \\ F(2) - \sum_{i \neq n_1, n_2, \ldots, n_K}^{N} y_i \cdot 2^{(i-1)} \\ F(2^2) - \sum_{i \neq n_1, n_2, \ldots, n_K}^{N} y_i \cdot 2^{(i-1)} \\ \vdots \\ F(2^{K-2}) - \sum_{i \neq n_1, n_2, \ldots, n_K}^{N} y_i \cdot 2^{(K-2)(i-1)} \\ F(2^{K-1}) - \sum_{i \neq n_1, n_2, \ldots, n_K}^{N} y_i \cdot 2^{(K-1)(i-1)} \end{bmatrix}$$

With this notation, the system of equations can be expressed in the form $$A \gamma = \rho.$$

The system of equations has a unique solution $\gamma$, provided that the determinant of the matrix A is not zero. The solution $\gamma$ contains the missing data symbols. The matrix A is a so-called Vandermonde matrix with a determinant given by $$det(A) = \Pi_{a>b}(2^{(n_a-1)} - 2^{(n_b-1)}).$$

Since a>b, $$2^{(n_a-1)} > 2^{(n_b-1)}.$$

Defining $$e_{a,b} := (2^{(n_a-1)} - 2^{(n_b-1)}),$$

the determinant of the matrix A is $$det(A) = \Pi_{a>b} e_{a,b}$$

Moreover, $$0 < e_{a,b} \leq 2^{(n_a-1)} - 1 < M_p,$$

which implies $$\Pi_{a>b} e_{a,b} \neq 0 (\bmod M_p),$$

since $$\Pi_{a>b} e_{a,b} > 0.$$

Since the arithmetic is performed over $GF(M_p)$, to show that the determinant does not vanish, one must also show that $M_p$ is not a factor of $\Pi_{a>b} e_{a,b}$. To see this, express the determinant as a product of prime factors. That is, $$\Pi_{a>b} e_{a,b} = p_1 p_2 \ldots p_\mu,$$

where $\mu \geq 1$, and $p_1, p_2, \ldots, p_\mu$ are prime. Moreover, either $e_{a,b}$ is prime, or can be written as the product of those primes. It follows that $$e_{a,b} < M_p \Rightarrow \text{for all } i=1, \ldots, \mu: p_i < M_p.$$

Since $M_p$ is prime, from the fundamental theorem of arithmetic (i.e., existence of unique prime factorization for any positive integer), it follows that $$\Pi_{a>b} e_{a,b} = p_1 p_2 \ldots p_\mu = q' \cdot M_p$$

(latter equality assuming the opposite, "$det(A)=0$")

$$\Rightarrow M_p = p_i \text{ for some } 1 \leq i \leq \mu.$$

This is a contradiction (reductio ad absurdum), since $M_p > p_i$. This concludes the proof that $det(A) \neq 0$ and, hence, the system of equations has a unique solution. In other words, whichever PDUs (e.g., frames) of the data transmission are missing, all data symbols (e.g., the missing PDUs or frames in a systematic implementation) can be recovered from just one set of retransmissions 514.

By way of example, suppose that 2 PDUs of the data transmission 512 are erased, which PDUs shall be labeled by n and n+m, wherein $1 \leq n < n+m \leq N$. Then, any 2 code symbols of the K code symbols $F(2^0), F(2^1), F(2^2), \ldots, F(2^{K-1})$ of the retransmission 514 are sufficient to recover all data symbols (e.g., the 2 missing data symbols corresponding to the 2 missing PDUs in a systematic implementation). That is, the entire data is recovered using any 2 of the retransmission PDUs.

Indeed, suppose that the retransmission PDUs i and i+j are successfully received, wherein $1 \leq i < i+j \leq K$. Then, the erased PDUs n and n+m of the data transmission 512 in a systematic implementation can be recovered provided that the matrix $$A = \begin{bmatrix} 2^{(i-1)(n-1)} & 2^{(i-1)(n+m-1)} \\ 2^{(i+j-1)(n-1)} & 2^{(i+j-1)(n+m-1)} \end{bmatrix}$$

is invertible. Factoring out $2^{(i-1)(n-1)}$ in the first row and $2^{(i+j-1)(n-1)}$ in the second row, the matrix becomes $$\begin{bmatrix} 1 & 2^{(i-1) \cdot m} \\ 1 & 2^{(i+j-1) \cdot m} \end{bmatrix},$$

the determinant of which is $$\det\left(\begin{bmatrix} 1 & 2^{(i-1) \cdot m} \\ 1 & 2^{(i+j-1) \cdot m} \end{bmatrix}\right) = 2^{(i+j-1) \cdot m} - 2^{(i-1) \cdot m} = 2^{(i-1) \cdot m}(2^{j \cdot m} - 1)$$

Thus, the determinant is zero in $GF(M_p)$ if and only if $2^{j \cdot m} = (1 \mod M_p)$. Since the order of 2 is p, $2^{j \cdot m} = (1 \mod M_p)$ if and only if $j \cdot m = (0 \mod p)$. That is, the determinant vanishes if and only if $j \cdot m$ is a multiple of p. Assuming the opposite of what is to be proven, $j \cdot m = q' \cdot p$, for some positive integer $q'$. Writing $j \cdot m$ as a product of prime factors, $j \cdot m = p_1 \cdot p_2 \ldots p_\vartheta$, wherein $p_1, p_2 \ldots, p_\vartheta$ are prime, it follows that $p_i < p$ for all $1 \leq i \leq \vartheta$, since both $j < K < p$ and $m < N < p$. But the fundamental theorem of arithmetic implies that $p = p_i$ for some $1 \leq i \leq \vartheta$, which gives a contradiction. Hence, $j \cdot m \neq (0 \mod p)$ and the determinant is non-zero in $GF(M_p)$. This shows that erasures in the second cycle transmissions can be tolerated without message loss, provided that no more than two erasures occur in the first cycle of transmissions. Numerical evidence suggests that any number of erasures in the second cycle transmissions (i.e., the data retransmission) can be tolerated without loss of the data (e.g., without message loss), provided that at least as many PDUs are successfully received in the data retransmission as lost in the data transmission (e.g., provided that fewer erasures occur in the first cycle of transmissions in case N=K).

The encoding process 300 and the decoding process 400 use an arithmetic (i.e., addition, subtraction, multiplication and, optionally, division) in the Galois field $GF(M_p)$, or $GF((M_p)^q)$. In any implementation or embodiment described herein, the arithmetic may be implemented by an integer arithmetic modulo $M_p$. More specifically, due to the very special form of the Mersenne prime $M_p$, the arithmetic can be implemented very efficiently in digital circuitry, e.g., according to the document "Implementing Exact Calculations in Hardware" by J. J. Thomas et al., IEEE Transactions on Computers, Vol. C-36, No. 6, pp. 764-768 and/or the document "The Calculation of Multiplicative Inverses Over GF(P) Efficiently Where P is a Mersenne Prime" by J. J. Thomas et al., IEEE Transactions on Computers, Vol. C-35, No. 5, pp. 478-482.

Alternatively or in addition, any embodiment or implementation disclosed herein may use at least one of the following arithmetic aspects.

As to one arithmetic aspect, any element $y \in GF(M_p)$ can be represented by a binary string of length p, with the convention that the string consisting only of ones represents the same number (e.g., the same code symbol or the same data symbol) as the string consisting only of zeros. That is, any element y of the finite field (e.g., any code symbol, any data symbol and/or the non-primitive element) may be represented by a string of p bits: $y = b_1 b_2 \ldots b_{p-1} b_p$, wherein each $b_n \in \{0,1\}$. The code symbols and/or data symbols may be represented by the so-called ones' complement notation used in Digital Signal Processing (DSP). Preferably, a scrambler or whitener prevents the occurrence of the all-zeros sequence.

As to another arithmetic aspect, addition, subtraction and/or multiplication by powers of 2 are efficiently implemented using the ones' complement arithmetic. The additive inverse of y is obtained by flipping each of the bits in y. That is, $-y = \bar{b}_1 \bar{b}_2 \ldots \bar{b}_{p-1} \bar{b}_p$, wherein $\bar{b}_n := 1 - b_n$. Alternatively or in combination, addition may correspond to the ordinary addition of integers in binary notation, except that any carry bit appearing in the most significant end of the p-bit adder is injected into the least significant bit. Alternatively or in combination, multiplication of y by $2^n$ is implemented by a circular shift of the bits representing y by n steps. If the least significant bit (LSB) is located at the right of a p-bit register, the shift is to the left if $n > 0$ and to the right if $n < 0$. Alternatively or in combination, multiplication modulo $M_p$ may be implemented by means of two p-bit registers and a 2p-bit multiplier. The multiplication may be performed according to the document "Implementing Exact Calculations in Hardware" by J. J. Thomas et al., IEEE Transactions on Computers, Vol. C-36, No. 6, pp. 764-768. Alternatively or in combination, the calculation of multiplicative inverses may be performed efficiently, e.g., as described in the document "The Calculation of Multiplicative Inverses Over GF(P) Efficiently Where P is a Mersenne Prime" by J. J. Thomas et al., IEEE Transactions on Computers, Vol. C-35, No. 5, pp. 478-482.

Implementing the encoding process 300 and/or the decoding process 400 requires only the above-mentioned arithmetic operations. More specifically, the encoding process 300 may be implemented using only additions and circular shifts.

The encoding process 300 and the decoding process 400, i.e. the retransmission protocol, are illustrated by means of a numerical example. The numerical example uses below parameters.

| p | α | N | K | $M_p$ |
|---|---|---|---|---|
| 7 | 2 | 5 | 4 | 127 |

The data is transferred to one or more receiving stations (i.e., remote nodes).

For the data transmission 512, the 5 data symbols $y_i$ are encoded (e.g., by an internal encoder) into N=5 frames, as shown in below Table.

Transmission Table

| Data Symbols | Binary representation in GF(127) for transmission frames |
|---|---|
| $y_1$ | 0010010 |
| $y_2$ | 0000011 |
| $y_3$ | 0110101 |
| $y_4$ | 0010111 |
| $y_5$ | 1011100 |

The polynomial of the step 508 is of degree N−1.

$$F(X) = y_1 + y_2 X + y_3 X^2 + y_4 X^3 + y_5 X^4.$$

The encoding process 300 for the data retransmission 514 is based on the N=5 data symbols $y_i$ representing the data of the data transmission 512. The polynomial is used in the step 510 to construct the code word.

The K=4 frames for the data retransmission are computed by evaluating the polynomial at integer powers of the non-primitive element α=2. Below Table includes the resulting code symbols for the data retransmission 514.

Retransmission Table

| Code Symbols | Binary representation in GF(127) for transmission frame |
|---|---|
| $F(2^0)$ | 0111110 |
| $F(2^1)$ | 1110010 |
| $F(2^2)$ | 1111001 |
| $F(2^3)$ | 1111000 |

The computation of $F(2^3)$ is shown as an example. By definition, $$F(2^3) = \Sigma_{i=1}^{5} y_i \cdot 2^{3(i-1)}.$$

The sum on the right-hand side consists of 5 terms, and each term is displayed in below Table. Multiplication by powers of 2 is implemented by means of circular left shifts.

| i | $y_i$ | $y_i \cdot 2^{3(i-1)}$ |
|---|---|---|
| 1 | 0010010 | 0010010 |
| 2 | 0000011 | 0011000 |
| 3 | 0110101 | 1011010 |
| 4 | 0010111 | 1011100 |
| 5 | 1011100 | 0010111 |

The 4th retransmission frame carrying the code symbol $F(2^3)$ is obtained in the step 510 by the addition of the numbers in the third column of above Table. The sum is computed step by step below:

```
 0010010
+0011000
=0101010
```

The next addition shows how a carry bit is injected into the LSB at the adder.

```
 0101010
+1011010
=0000101
 0000101
+1011100
=1100001
 1100001
+0010111
=1111000
```

Hence, $F(2^3) = 1111000$.

As exemplified above, the encoding process 300 requires only additions and circular shifts.

The decoding process 400 is exemplified by continuing above numerical example. Suppose that the third and fifth frames of the data transmission (i.e., the data symbols $y_3$ and $y_5$) are erased, and that the first and fourth retransmissions (i.e., the code symbols $F(2^0)$ and $F(2^3)$) are received. Using the above-defined notation, the inhomogeneity, ρ, of the linear equation system is computed:

$$\rho = \begin{bmatrix} F(1) - y_1 - y_2 - y_4 \\ F(2^3) - y_1 - y_2 \cdot 2^{3(2-1)} - y_4 \cdot 2^{3(4-1)} \end{bmatrix} = \begin{bmatrix} 0010010 \\ 1110001 \end{bmatrix}.$$

For illustration, the computation of the first term is performed as follows:

$$\rho(1) = F(1) - y_1 - y_2 - y_4$$

$$= 0111110 - 0010010 - 0000011 - 0010111$$

According to the implementation of the arithmetic, the negative of a number is obtained by flipping the bit polarizations, i.e., $$\rho(1) = 0111110 + 1101101 + 1111100 + 1101000.$$

The addition, using ones' complement addition with injection of a carry bit at the most significant bit (MSB) side of the adder into the LSB, yields $\rho(1) = 0010010$.

In order to recover the two data symbols $y_3$ and $y_5$ erased in the data transmission 512 (i.e., the erased transmission frames), the decoder 200 solves the following system of equations in the finite field GF(127):

$$\begin{bmatrix} 1 & 1 \\ 2^{3(3-1)} & 2^{3(5-1)} \end{bmatrix} \begin{bmatrix} y_3 \\ y_5 \end{bmatrix} = \begin{bmatrix} 0010010 \\ 1110001 \end{bmatrix}.$$

Multiplying the second row by $2^{-5}$ results in:

$$\begin{bmatrix} 1 & 1 \\ 2 & 2^7 \end{bmatrix} \begin{bmatrix} y_3 \\ y_5 \end{bmatrix} = \begin{bmatrix} 0010010 \\ 1000111 \end{bmatrix},$$

wherein $2^7 = 2^p = 1 \pmod{M_p}$. Hence, the system of equations $$\begin{bmatrix} 1 & 1 \\ 2 & 1 \end{bmatrix} \begin{bmatrix} y_3 \\ y_5 \end{bmatrix} = \begin{bmatrix} 0010010 \\ 1000111 \end{bmatrix}$$

is to be solved in the step 404. Subtracting the second equation from the first results in the first missing data symbols:

$y_3 = 1000111 - 0010010$ $= 1000111 + 1101101 = 0110101.$

The last missing data symbols is computed according to $y_5 = 0010010 - y_3$ $= 0010010 + 1001010 = 1011100.$ Thus, the two erased frames $y_3$ and $y_5$ of the data transmission 512 are correctly decoded in the step 404 from the first cycle of transmissions 512 and the second cycle of transmissions 514 (i.e., the data transfer) by the decoder 200.

More generally, the system of equations in $GF(M_p)$, $$\begin{bmatrix} 1 & 1 \\ 1 & 2^k \end{bmatrix} \begin{bmatrix} y_a \\ y_b \end{bmatrix} = \begin{bmatrix} r_a \\ r_b \end{bmatrix},$$

yields $y_b \cdot (2^k - 1) = r_b - r_a$ and, hence, the solution requires the computation of the inverse $(2^k - 1)^{-1}$ in $GF(M_p)$. This computation can be performed efficiently as described in the document "The Calculation of Multiplicative Inverses Over GF(P) Efficiently Where P is a Mersenne Prime" by J. J. Thomas et al., IEEE Transactions on Computers, Vol. C-35, No. 5, pp. 478-482.

Some distinguishing features of embodiments of the technique are outlined over existing Reed-Solomon codes, e.g., as described in the document "An Improved Broadcast Retransmission Protocol" by J. J. Metzner, IEEE Transactions on Communications, Vol. COM-32, No. 6, pp. 679-683 (Metzner protocol).

| Parameter | Parameter description | Protocol of Metzner | Embodiment |
|---|---|---|---|
| s | Number of elements in the Field | $2^B$ (power of 2) | $M_p = 2^p - 1$ (Mersenne prime) |
| α | Element used to generate the code word | Primitive element (order = s − 1) | Non-primitive element (order = p < s − 1) |
| N | Number of transmission frames for the data | N < s | N < p |
| K | Number of retransmissions frames | K < s − N | K < p |

Two synergetic distinguishing features can be of fundamental and/or practical importance. First, the element ca used to generate the code word is non-primitive. Second, the number of elements in the finite field (i.e., its size) is a Mersenne prime.

The Metzner protocol follows the methodology of Reed-Solomon coding and employs a primitive element. Since the number of elements is a power of 2, each element in the field can be interpreted as a tuple of bits. The code-word generation, the arithmetic and the algorithmic properties of encoder and decoder are highly dependent upon these parameters. In general, the arithmetic in Galois fields whose size is a power of 2 is involved and significantly different from ordinary integer arithmetic. In contrast, the technique uses a non-primitive element. Even though the element ca is non-primitive, the decoder 200 can recover erased PDUs. Furthermore, the number 2 is a non-primitive element (except for the case p=2) that is well-suited to generate the code symbols (i.e., the PDUs, e.g., the frames) for the retransmission 514. This together with the fact that the size of the finite field is a Mersenne prime, enables the use of fast integer arithmetic, e.g., including a ones' complement representation of integers, while ensuring that the generated code symbols possess the desirable property that any missing PDU can be recovered from the same group of retransmitted PDUs.

Any embodiment or implementation herein may be extension to composite PDU sizes (e.g., composite frame sizes). In the discussion above, each PDU comprises p bits, wherein $M_p = 2^p - 1$ is a Mersenne prime number (and, hence, p is also a prime number). It is possible to extend the retransmission protocol to certain composite (i.e., not prime) PDU sizes.

Some mathematical preliminaries are useful to describe such extended embodiments. The Legendre symbol, $$\left( \frac{-1}{c} \right),$$

describes whether or not −1 is a quadratic residue modulo c by equating to +1 and −1, respectively. For the Mersenne prime $M_p$, the Legendre symbol $$\left( \frac{-1}{M_p} \right) = -1,$$

since $M_p \equiv 3 \pmod{4}$ because $2^p \equiv 0 \pmod{4}$. That is, −1 is not a quadratic residue modulo the Mersenne prime $M_p$. In other words, the equation $x^2 = -1$ does not have a solution modulo $M_p$. Hence, the polynomial $f(x) = x^2 + 1$ is irreducible in $GF(M_p)$.

Therefore, the Galois field $GF((M_p)^q)$ with q=2 is representable by adjoining a root, J, of the polynomial $f(x) = x^2 + 1$ to finite field $GF(M_p)$. Any element $y \in GF((M_p)^2)$ can be written in the form $y = a + b \cdot J$, wherein a, $b \in GF(M_p)$. The arithmetic in $GF((M_p)^2)$ is reminiscent to the arithmetic of complex numbers, except that real-part arithmetic operations are replaced by the arithmetic operations in $GF(M_p)$. For example, for any $y_1=a+b\cdot J$ and $y_2=c+d\cdot J$, wherein a, b, c, d $\in GF(M_p)$,
$y_1 \cdot y_2 = (ac-bd \pmod{M_p}) + (ad+bc \pmod{M_p}) \cdot J$. Consequently, the arithmetic in $GF((M_p)^2)$ is implemented efficiently using ones' complement arithmetic.

Furthermore, any element $y \in GF((M_p)^2)$ is represented or representable by a string of 2p bits:

$$y=(b_1 b_2 \ldots b_{p-1} b_p c_1 c_2 \ldots c_{p-1} c_p),$$

wherein each $b_i$, $c_i \in \{0,1\}$.

Any embodiment or implementation of the retransmission protocol may be extended as follows. First, the data (e.g., a message) to be transmitted is split into N transmission PDUs (e.g., frames) carrying the data symbols $y_n$, n=1, ..., N in the step 302. Each transmission PDU contains 2p bits, wherein $M_p=2^p-1$ is a Mersenne prime. Hence, each transmission PDU can be considered as an element in the Galois field $GF((M_p)^2)$. That is, $y_n \in GF((M_p)^2)$, n=1, ..., N.

Second, a non-primitive element $\alpha \in GF((M_p)^2)$ is chosen. For $p \geq 3$, it is advantageous to set $\alpha = 2 + 2 \cdot J$, since in this case the number $2+2 \cdot J$ is not a primitive element of $GF((M_p)^2)$, its powers are easily computed and multiplication by powers of $\alpha$ can be implemented by circular shifts. Other choices, such as $\alpha = 2+J$, are also possible.

Third, a polynomial $F(X)=y_1+y_2 X+y_3 X^2+ \ldots +y_{N-1} X^{N-2}+y_N X^{N-1}$ over $GF((M_p)^2)$ is generated. The coefficients of the polynomial are the data symbols (e.g., the transmission PDUs) representing the data to be transmitted. Evaluating the polynomial at any element $\beta \in GF((M_p)^2)$, generates another element $F(\beta) \in GF((M_p)^2)$.

Fourth, a set of K code symbols $[F(\alpha^0), F(\alpha^1), F(\alpha^2), \ldots, F(\alpha^{K-1})]$ is generated by evaluating the polynomial $F(X)$ at powers of the non-primitive $\alpha$. Preferably, the number of retransmissions, K, is less than the order of the non-primitive $\alpha$, order($\alpha$), in order not to lose any erasure correction capabilities.

Fifth, in a first cycle of transmissions 512, the N transmission PDUs including the data symbols $[y_1, y_2, y_3, \ldots, y_N]$, respectively, are transmitted. Sixth, in a second cycle of transmissions 514, the code symbols $[F(\alpha^0), F(\alpha^1), F(\alpha^2), \ldots, F(\alpha^{K-1})]$ are transmitted. These retransmissions are either triggered by ACKs or NACKs from the receiving stations or are preemptive (i.e., performed to decrease the probability of failure in message decoding by the remote nodes).

In an implementation with the number of frames N<order($\alpha$) and the number of retransmissions K<order($\alpha$), any receiving station including an instance of the device 200 is enabled to recover any set of K transmission PDUs erased in the first transmission cycle 512, provided it has received the K retransmission PDUs transmitted in the second transmission cycle 514. Indeed, above considerations as to the regularity of the Vandermonde matrix may also be applied to the extended embodiments, which demonstrates that the corresponding Vandermonde matrix of the extended embodiment is invertible in $GF((M_p)^2)$.

Figure 6:
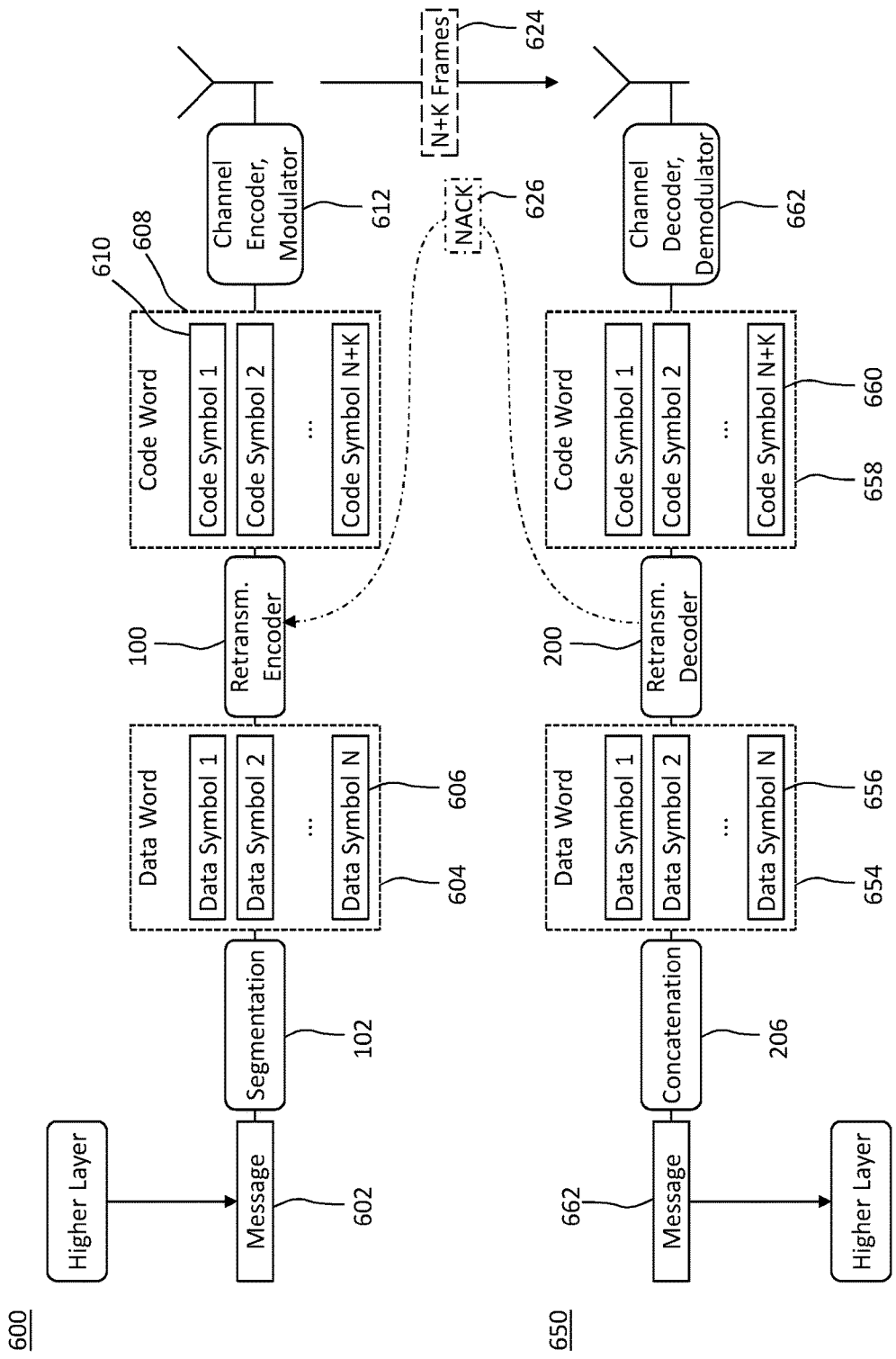
FIG. 6 shows schematic block diagrams for a first embodiment of the transmitting and receiving devices at a transmitting station and a receiving station, respectively, in a radio communication.

FIG. 6 shows a schematic block diagram of a transmitting station 600 including the device 100 and a receiving station 650 including the device 200 according to a first embodiment. The first embodiment is compatible with any of the above-mentioned implementations or embodiments.

The first embodiment implements the retransmission protocol on the physical (PHY) layer of a protocol stack for the data transfer. The data 602 to be transmitted is provided by a layer that is higher than the PHY layer (e.g., a MAC layer or a RLC layer) in the protocol stack. The segmentation module (or segmenting unit) 102, which may be included in the device 100, splits the data 602 according to the step 302, resulting in the data word 604 comprising N data symbols 606.

The device 100, i.e., the encoder of the retransmission protocol, generates the code word 608 comprising the N+K code symbols 610 for the data transfer. While the N+K code symbols are expressly indicated in the block diagram of FIG. 6, up to N of the code symbols can be identical to the data symbols 606 in a systematic implementation.

In the first embodiment of FIG. 6, the code symbols 610 are input to a conventional channel encoder (e.g., as an inner encoder) and/or modulator, which unit is generically referred to by reference sign 612. That is, the device 100 is arranged upstream of the conventional unit 612, which transmits the N+K PDUs 624 (e.g., frames) carrying the N+K code symbols 610, respectively.

The code word 658, as received at the receiving station 650, may include any subset of successfully received N code symbols 660. The device 200, i.e., the decoder of the retransmission protocol is arranged downstream of a conventional unit 662 for channel decoding and/or demodulation. Based on any received N code symbols 660, the device 200 outputs the data word 654 comprising the N data symbols 656. A concatenation module (or concatenating unit) 206 combines the N data symbols 656 to recover the data 662.

Optionally, the device 200 reports for each successfully received PDU 624 an ACK signal, for each corruptly received PDU 624 a NACK signal 626 and/or a number of successfully and/or corruptly received PDUs 624 to the device 100. While the report may be transmitted and received through the same transceiver chains also used for the data transfer, the report may also be sent using another communication channel. Based on the report received from one or more receiving stations 650, the device 100 control the number K of retransmission PDUs.

Figure 7:
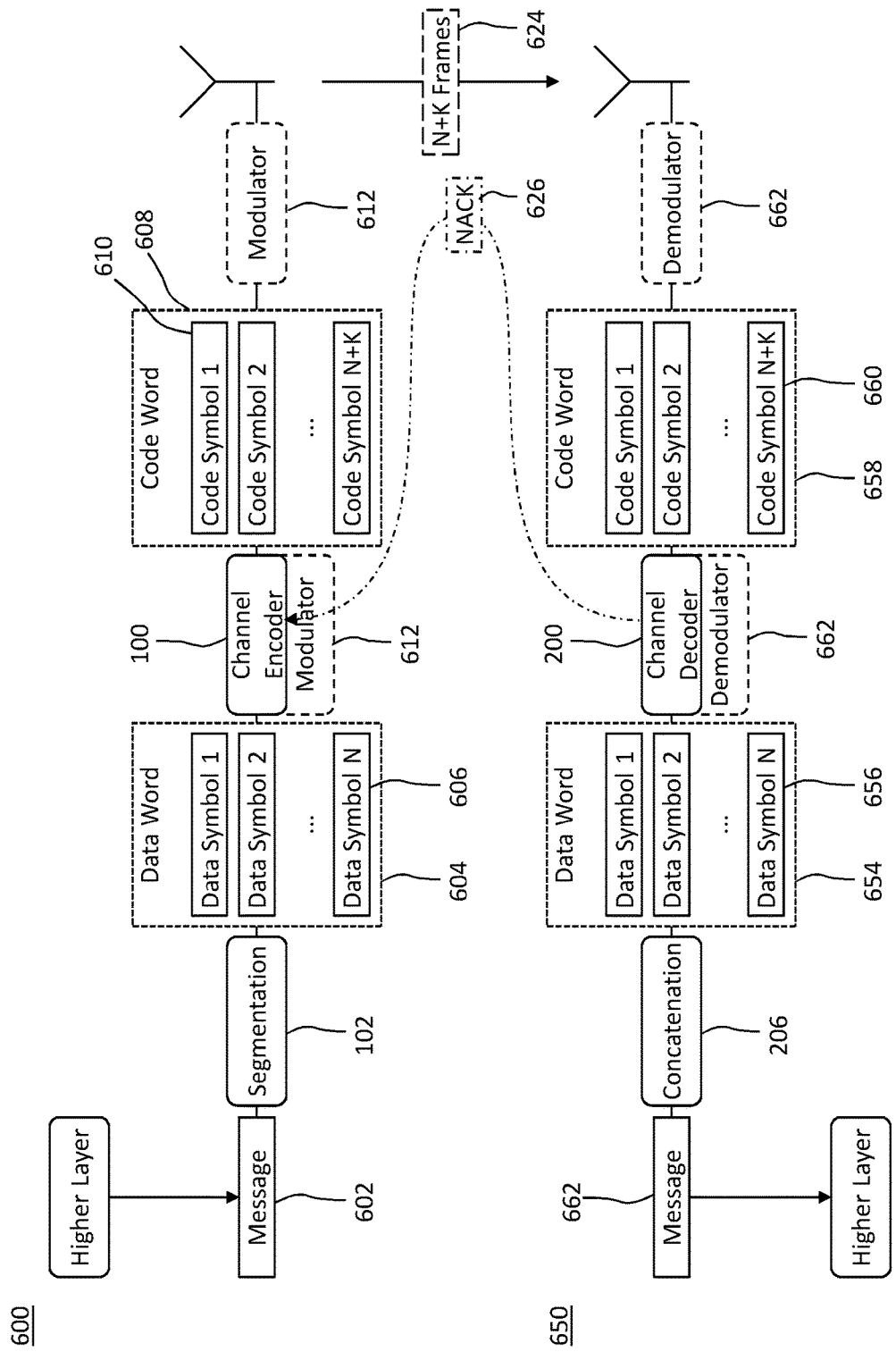
FIG. 7 shows schematic block diagrams for a second embodiment of the transmitting and receiving devices at a transmitting station and a receiving station, respectively, in a radio communication.

FIG. 7 shows a schematic block diagram of a transmitting station 600 including the device 100 and a receiving station 650 including the device 200 according to a second embodiment. The second embodiment is compatible with any of the above-mentioned implementations or embodiments. Equivalent and/or interchangeable features are indicated by like reference signs.

The second embodiment implements the retransmission protocol on the PHY layer of the protocol stack for the data transfer. The data 602 to be transmitted may be provided by the MAC or RLC layer of the protocol stack.

The device 100 functions as both (e.g., outer) encoder for the retransmission protocol and (e.g., inner) channel encoder. Preferably, the evaluations of the polynomial provide code symbols 610 that are significantly longer (e.g., about 3-fold longer) than the data symbols (e.g., the data portions) provided by the segmenting unit 102. For example, the data symbols are complemented by a fixed bit string to match the bit length p that is input to the device 100. Thus, the generated code symbols 610 are in a proper subset of the finite field.

The data 602 to be transmitted may be a transport block (TB). Each data portion for one of the data symbols 606 may be a code block (CB).

A conventional modulator 612 may be arranged downstream of the device 100. Alternatively, the device 100 outputs the code symbols 610 as modulation signals.

At the receiving station 650, the device 200 functions as both (e.g., outer) decoder for the retransmission protocol and (e.g., inner) channel decoder. Received code symbols 660 that are not within the subset of the finite field, are marked as erased (or buffered at the demodulator 662 for soft-combining with further retransmission versions of the same code symbol). As soon as N code symbols 660 are successfully received, the device 200 outputs the N data symbols 656.

Figure 8:
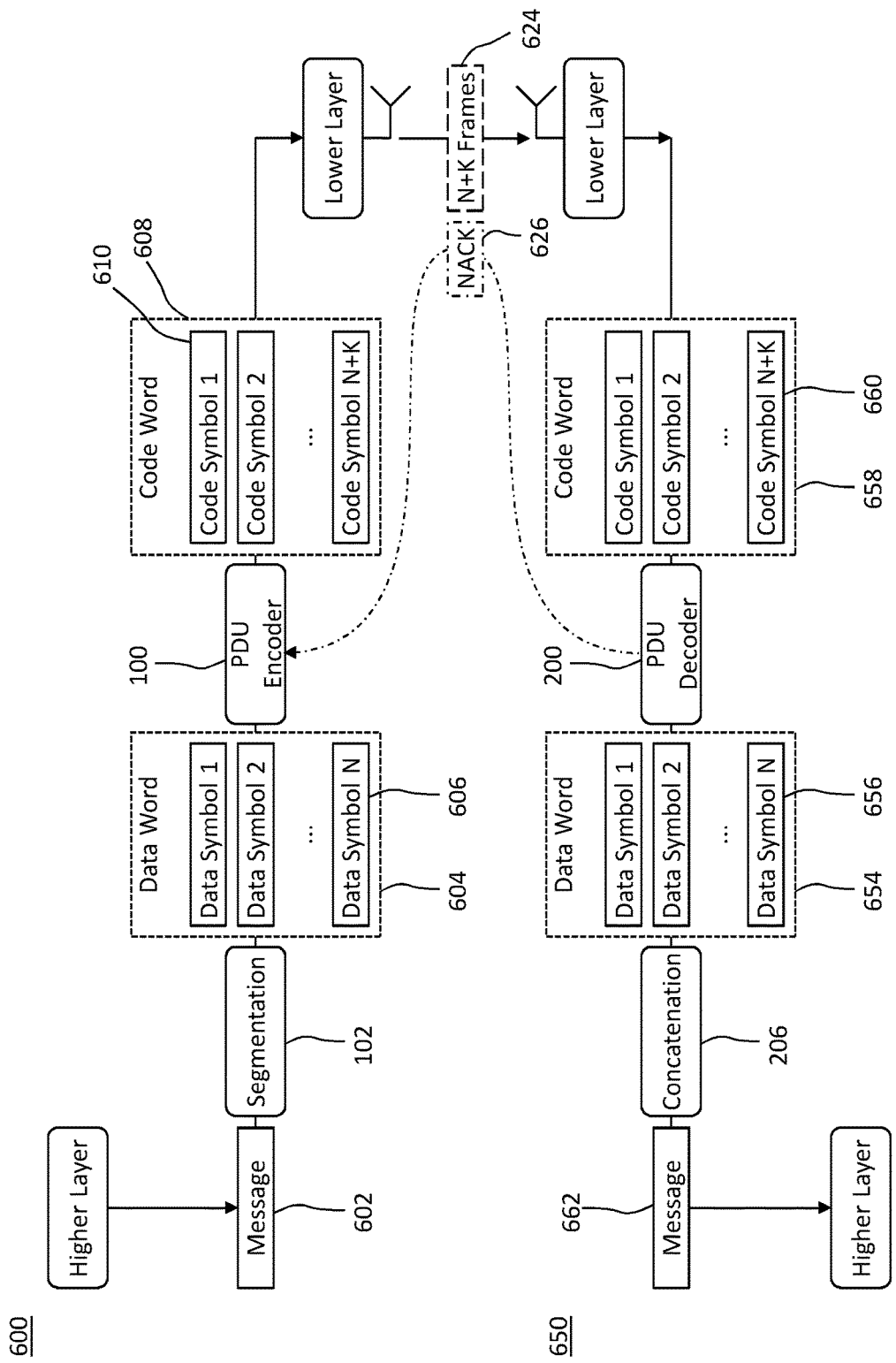
FIG. 8 shows schematic block diagrams for a third embodiment of the transmitting and receiving devices at a transmitting station and a receiving station, respectively, in a radio communication.

FIG. 8 shows a schematic block diagram of a transmitting station 600 including the device 100 and a receiving station 650 including the device 200 according to a third embodiment. The third embodiment is compatible with any of the above-mentioned implementations or embodiments. Equivalent and/or interchangeable features are indicated by like reference signs.

The third embodiment implements the retransmission protocol on a layer higher than the PHY layer, e.g., on the MAC or RLC layer. The device 100 functions as a PDU encoder, e.g., for MAC PDUs or RLC PDUs.

The data 602 to be transmitted is provided by the RLC layer or a packet data convergence protocol (PDCP) layer, e.g., according to 3GPP LTE. For example, the data is an RLC service data unit (SDU). The segmenting unit 102 may be implemented by the RLC layer.

The device 100, e.g., in an implementation on the RLC layer, may be spaced apart from the transmitting station 600. The RLC layer may be implemented by a server, e.g., in a core network coupled to the transmitting station 600. The device 100 initiates the transmission in the step 306.

The code symbols 610 output by the device 100 in the step 306 are processed on a lower layer, e.g., the MAC or PHY layer. At the receiving station 650, the device 200 receives the code symbols 660 from the lower layer. Based on the successfully received code symbols, the device 200 output the data 662 (or the data symbols 656 thereof). While functionality of the lower layer may be collocated with the receiving station 650, the successfully received code symbols may be forwarded to the device 200 that spaced apart from the receiving station 650.

Figure 9:
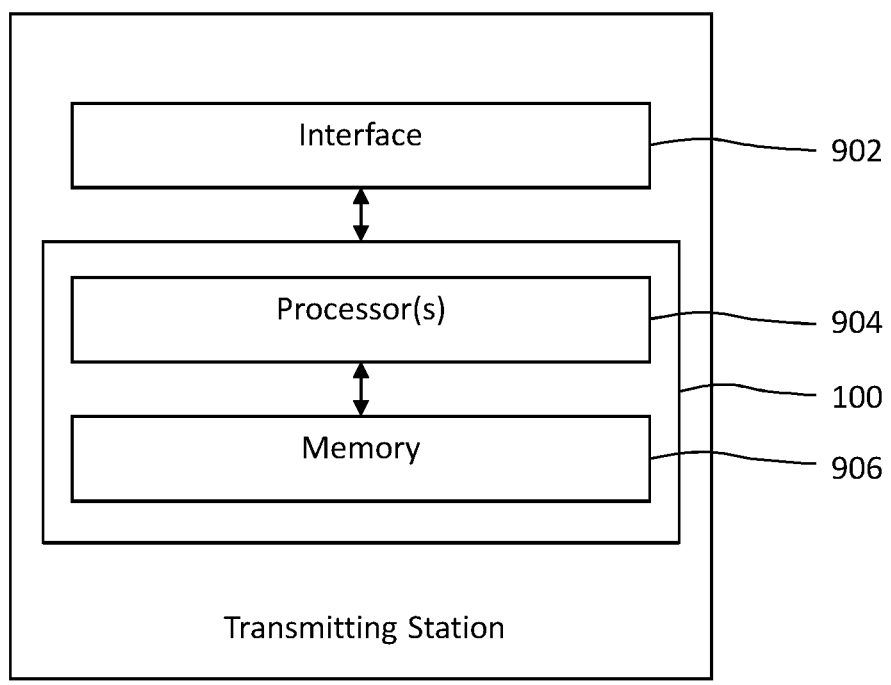
FIG. 9 shows a schematic block diagram of an embodiment of the transmitting device at a transmitting station, which is combinable with any embodiment of FIGS. 1, 3, 5 and 6 to 8.

FIG. 9 shows a schematic block diagram for an embodiment of the device 100. The device 100 comprises one or more processor(s) 904 for performing the method 300 and memory 906 coupled to the processor(s) 904. For example, the memory 906 may be encoded with instructions that implement at least one of the modules 102, 104 and 106.

The one or more processor(s) 904 may be a combination of one or more of a microprocessor, controller, microcontroller, central processing unit, digital signal processor, application specific integrated circuit, field programmable gate array, or any other suitable computing device, resource, or combination of hardware, microcode and/or encoded logic operable to provide, either alone or in conjunction with other components of the device 100, such as the memory 906, data transmitter functionality. For example, the one or more processor(s) 904 may execute instructions stored in the memory 906. Such functionality may include providing various features and steps discussed herein, including any of the benefits disclosed herein. The expression "the device being operative to perform an action" may denote the device 100 being configured to perform the action.

As schematically illustrated in FIG. 9, the device 100 may be embodied by the transmitting station 600. The transmitting station 600 comprises a radio interface 902 coupled to the device 100 for radio communication with one or more receiving stations.

Figure 10:
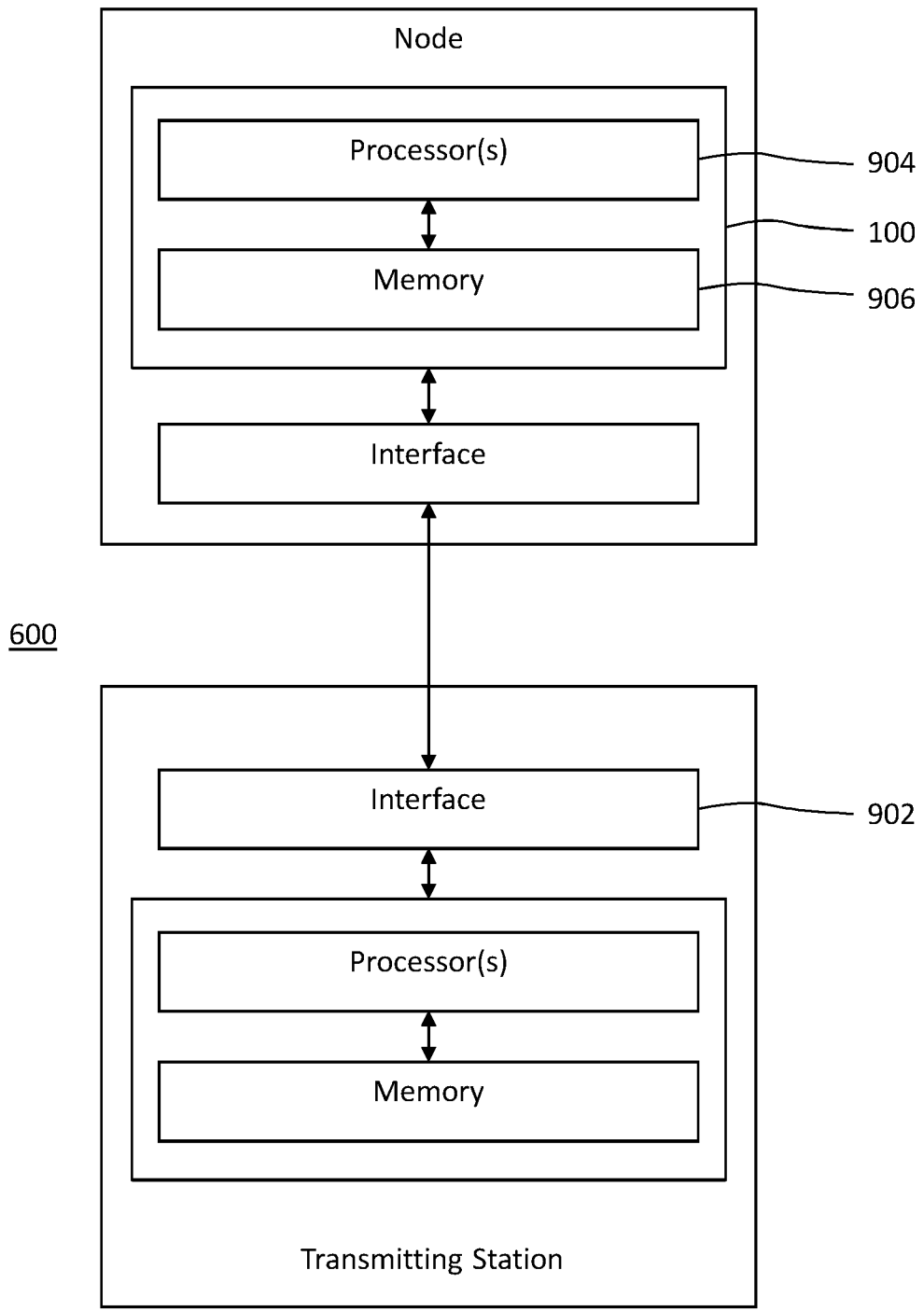
FIG. 10 shows a schematic block diagram of an embodiment of the transmitting device outside of a transmitting station, which is combinable with any embodiment of FIGS. 1, 3, 5 and 6 to 8.

In a variant, e.g., as schematically illustrated in FIG. 10, the functionality of the device 100 is provided by a node of the radio network. That is, the node performs the method 300. The functionality of the device 100 is provided by the node to the transmitting station 600, e.g., via the interface 902 or a dedicated wired or wireless interface.

Figure 11:
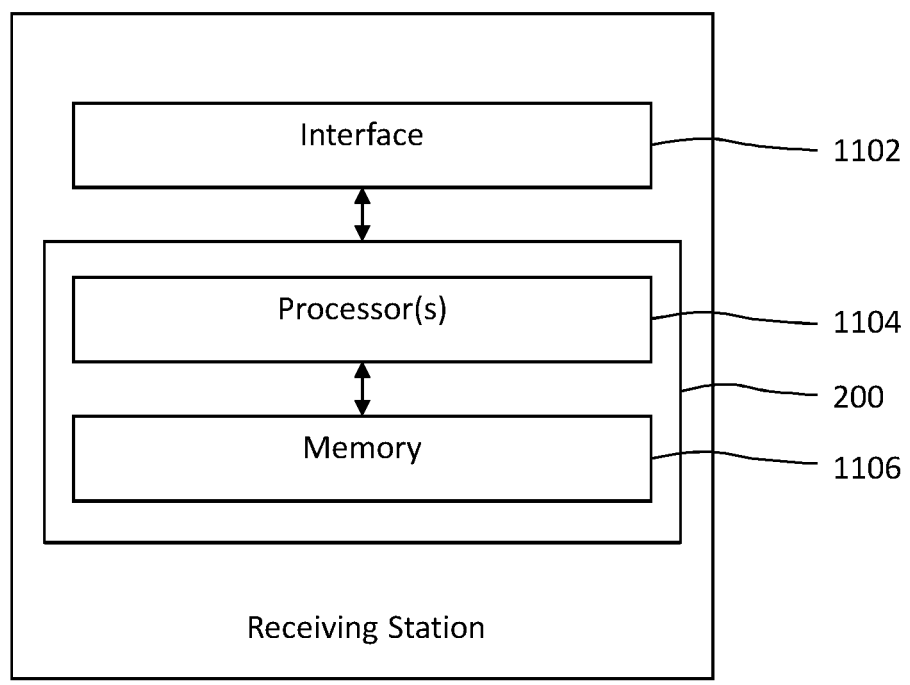
FIG. 11 shows a schematic block diagram of an embodiment of the receiving device at a receiving station, which is combinable with any embodiment of FIGS. 2, 4 and 6 to 8.

FIG. 11 shows a schematic block diagram for an embodiment of the device 200. The device 200 comprises one or more processor(s) 1104 for performing the method 400 and memory 1106 coupled to the processor(s) 1104. For example, the memory 1106 may be encoded with instructions that implement at least one of the modules 202, 204 and 206.

The one or more processor(s) 1104 may be a combination of one or more of a microprocessor, controller, microcontroller, central processing unit, digital signal processor, application specific integrated circuit, field programmable gate array, or any other suitable computing device, resource, or combination of hardware, microcode and/or encoded logic operable to provide, either alone or in conjunction with other components of the device 200, such as the memory 1106, data receiver functionality. For example, the one or more processor(s) 1104 may execute instructions stored in the memory 1106. Such functionality may include providing various features and steps discussed herein, including any of the benefits disclosed herein. The expression "the device being operative to perform an action" may denote the device 200 being configured to perform the action.

As schematically illustrated in FIG. 11, the device 100 may be embodied by the receiving station 650. The receiving station 650 comprises a radio interface 1102 coupled to the device 200 for radio communication with a transmitting station.

Figure 12:
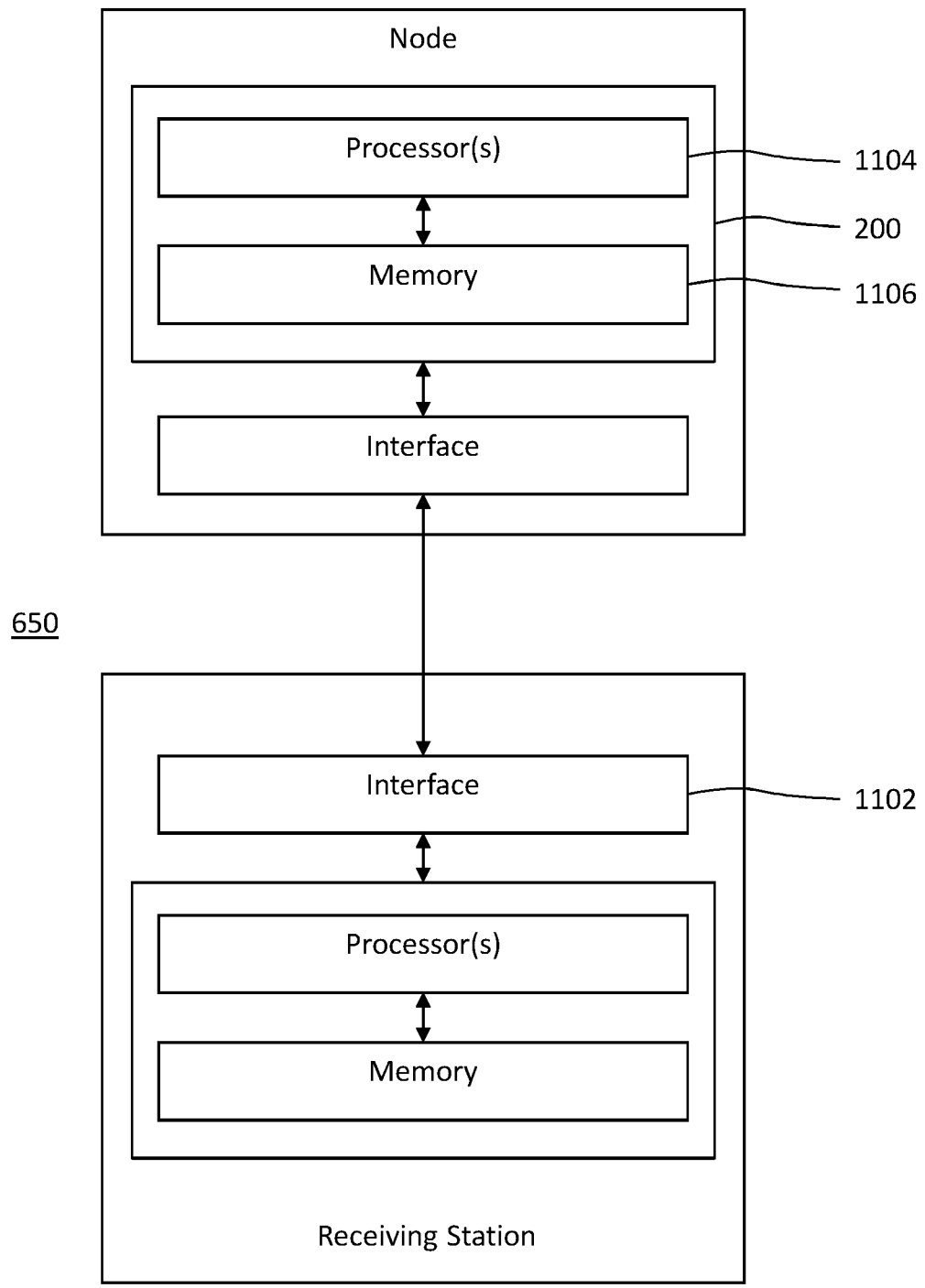
FIG. 12 shows a schematic block diagram of an embodiment of the receiving device outside of a receiving station, which is combinable with any embodiment of FIGS. 2, 4 and 6 to 8.

In a variant, e.g., as schematically illustrated in FIG. 12, the functionality of the device 200 is provided by a node of the radio network. That is, the node performs the method 400. The functionality of the device 200 is provided by the node to the receiving station 650, e.g., via the interface 1102 or a dedicated wired or wireless interface.

As has become apparent from above description, embodiments of the technique provide a retransmission technique that achieves the same erasure correction effects of existing retransmission protocols with significantly less computational complexity. The technique can significantly reduce the computational complexity compared to existing MDS codes and optimal fountain codes.

Same or further embodiments require only a simple systemization, and the necessary arithmetic operations for encoding and decoding can be performed efficiently, e.g., using an arithmetic well-suited for low-end IoT devices.

The technique can be implemented as a retransmission protocol, e.g., for unicasting or broadcasting on erasure channels. The technique is beneficially implemented in a wireless broadcast communication. Even if the transmitting station does not know whether or not a particular receiving station has received a certain PDU, by broadcasting the more than N PDUs, the transmitting station can ensure with high probability that the one or more receiving stations have successfully received sufficient code symbols to decode the data. The number q>N of transmitted PDUs allows controlling the probability.

The technique can be implemented in stand-alone and ad-hoc networks, e.g., meshed Bluetooth networks, or in communication systems according to 3GPP LTE and newly developed radio access network such as 3GPP 5G NR.

Many advantages of the present invention will be fully understood from the foregoing description, and it will be apparent that various changes may be made in the form, construction and arrangement of the units and devices without departing from the scope of the invention and/or without sacrificing all of its advantages. Since the invention can be varied in many ways, it will be recognized that the invention should be limited only by the scope of the following claims.

The invention claimed is:

1. A method of transmitting data that is representable by N data symbols of a finite field, the size of which field is an integer power of a Mersenne prime, the method comprising the steps of:
 determining, based on the N data symbols, a polynomial over the finite field; and
 transmitting or initiating to transmit the data using more than N code symbols of the finite field, at least one of the code symbols corresponding to an evaluation of the polynomial at a non-primitive element of the finite field.

2. A computer program product comprising a non-transitory computer readable medium storing program code for causing a device executing the program code to perform the method of claim 1.

3. A method of receiving data that is representable by N data symbols of a finite field, the size of which field is an integer power of a Mersenne prime, the method comprising the step of:
 determining the N data symbols based on at least N received code symbols out of more than N code symbols, wherein the determining includes determining a polynomial over the finite field based on the at least N received code symbols, at least one of the code symbols corresponding to an evaluation of the polynomial at a non-primitive element of the finite field.

4. A computer program product comprising a non-transitory computer readable medium storing program code for causing a device executing the program code to perform the method of claim 3.

5. A device for transmitting data that is representable by N data symbols of a finite field, the size of which field is an integer power of a Mersenne prime, the device comprising at least one processor and a memory, said memory comprising instructions executable by said at least one processor, wherein the device is operative to:
 determine, based on the N data symbols, a polynomial over the finite field; and
 transmit or initiate to transmit the data using more than N code symbols of the finite field, at least one of the code symbols corresponding to an evaluation of the polynomial at a non-primitive element of the finite field.

6. The device of claim 5, wherein N of the code symbols correspond to the N data symbols, and the device is operable to transmit the N data symbols prior to the transmission, or the initiation of the transmission, of the at least one of the code symbols.

7. The device of claim 5, wherein the size of the field is a Mersenne prime or the square of a Mersenne prime.

8. The device of claim 5, wherein
 the device is operable to generate at least one of the code symbols by evaluating the polynomial at different powers of the non-primitive element, and
 the order of the non-primitive element in the finite field is equal to or greater than the number of the at least one of the code symbols.

9. The device of claim 5, wherein the Mersenne prime is equal to 2p-1 with a prime p>2, and wherein the non-primitive element is equal to 2 or an integer power of 2.

10. The device of claim 5, wherein the order of the non-primitive element in the finite field is equal to or greater than the number of the more than N code symbols.

11. The device of claim 5, wherein
 the device is operable to determine the polynomial by linearly mapping the N data symbols to coefficients of the polynomial, and
 the device is operable to determine the polynomial by coefficients of the polynomial that are equal to the N data symbols.

12. The device of claim 5, wherein a degree of the polynomial is less than N.

13. The device of claim 5, wherein to device is operable to transmit each of the more than N code symbols or is operable to initiate for the transmission of each of the more than N code symbols in a separate packet data unit or frame, and/or wherein each code symbol comprises or is associated with a portion for error detection.

14. The device of claim 5, wherein the device is further operable to map or to initiate to map the data to the N data symbols.

15. The device of claim 5, wherein
 the Mersenne prime is equal to 2p-1,
 each data symbol comprises p bits or an integer multiple thereof, and
 the device is further operable to generate or initiate to generate the N data symbols by segmenting the data into groups of p bits or integer multiples thereof.

16. The device of claim 15, wherein the device is operable to generate the data symbols by scrambling or whitening the data so that each of the N data symbols comprises at least one bit being one and at least one bit being zero.

17. The device of claim 5, wherein at least one of the determination and the evaluation includes performing circular bit shifts.

18. A device for receiving data that is representable by N data symbols of a finite field, the size of which field is an integer power of a Mersenne prime, the device comprising at least one processor and a memory, said memory comprising instructions executable by said at least one processor, wherein the device is operative to:
 determine the N data symbols based on at least N received code symbols out of more than N code symbols, wherein the determining includes determining a polynomial over the finite field based on the at least N received code symbols, at least one of the code symbols corresponding to an evaluation of the polynomial at a non-primitive element of the finite field.

19. The device of claim 18, wherein the device is operable to determine the data symbols by linearly mapping coefficients of the polynomial to the N data symbols.

20. The device of claim 18, wherein the device is further operable to map or initiate to map the N data symbols to the data.

21. The device of claim 18, wherein
 the Mersenne prime is equal to 2p-1,
 each data symbol comprises p bits or a multiple thereof, and
 the device is further operable to generate or initiate to generate the data by concatenating the N data symbols as groups of p bits or multiples thereof.

22. The device of claim 18, wherein the device is operable to generate or to initiate to generate the data by descrambling or unwhitening the data symbols.

* * * * *